(12) United States Patent
Iseki

(10) Patent No.: US 6,483,487 B2
(45) Date of Patent: *Nov. 19, 2002

(54) PLASMA DISPLAY AND METHOD OF DRIVING THE SAME

(75) Inventor: Koki Iseki, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/428,088

(22) Filed: Oct. 27, 1999

(65) Prior Publication Data

US 2002/0044106 A1 Apr. 18, 2002

(30) Foreign Application Priority Data

Oct. 27, 1998 (JP) .......................... 10-305272

(51) Int. Cl.[7] ............................................... G09G 3/28
(52) U.S. Cl. .............................. 345/60; 345/68; 345/41; 345/42
(58) Field of Search ............................. 345/60, 68, 69, 345/70, 41, 42; 315/169.4, 169.3; 313/484

(56) References Cited

U.S. PATENT DOCUMENTS

| 5,210,469 A | * | 5/1993 | Kim ........................ 345/169.4 |
| 5,654,728 A | * | 8/1997 | Kanazawa et al. ............ 345/68 |
| 5,943,030 A | * | 8/1999 | Minamibayashi ............ 345/60 |
| 6,262,699 B1 | * | 7/2001 | Suzuki et al. ................. 345/68 |

FOREIGN PATENT DOCUMENTS

| JP | 4-42289 | 2/1992 |
| JP | 6-337654 | 12/1994 |
| JP | 7-162787 | 6/1995 |
| JP | 8-152865 | 6/1996 |
| JP | 9-68946 | 3/1997 |
| JP | 9-185342 | 7/1997 |
| JP | 9-251279 | 9/1997 |
| JP | 9-307838 | 11/1997 |

* cited by examiner

Primary Examiner—Dennis-Doon Chow
Assistant Examiner—Alecia D. Nelson
(74) Attorney, Agent, or Firm—Choate, Hall & Stewart

(57) ABSTRACT

In a plasma display, a matrix electrode section includes scan electrodes, sustain electrodes, and data electrodes. Driving sections are connected to the scan, sustain, and data electrodes to drive display cells. Each driving section includes transistors for alternately applying first and second sustain pulses with positive and negative potentials with respect to the reference potential of the data electrode to the scan and sustain electrodes such that the potential relationship between the scan and sustain electrodes is periodically reversed, a transistor for applying a scan pulse with a negative potential higher than the potential of the second sustain pulse to the scan electrode to superimpose the scan pulse on the second sustain pulse, a transistor for applying a semi-selection pulse with a potential lower than the potential of the first sustain pulse to the sustain electrode corresponding to the scan electrode upon application of a scan pulse to the scan electrode, and transistors for selectively applying a data pulse with a positive potential with respect to the reference potential to the data electrode in accordance with the application timing of a scan pulse to the scan electrode. A driving method for a plasma display is also disclosed.

18 Claims, 16 Drawing Sheets

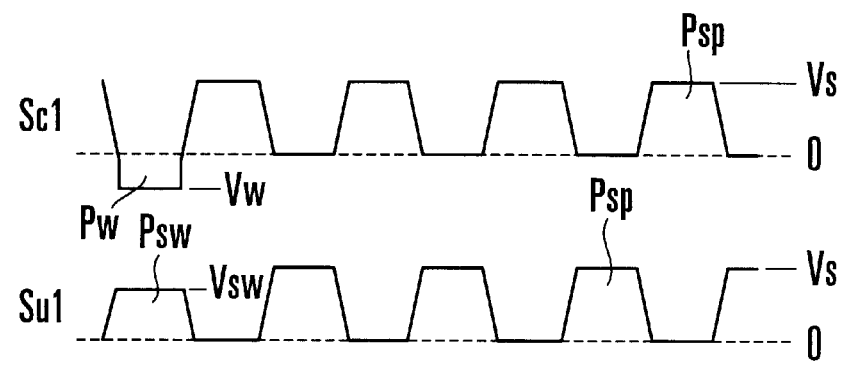
FIG. 5A Sc1
FIG. 5B Su1
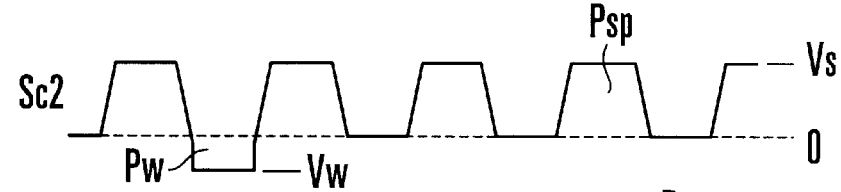
FIG. 5C Sc2
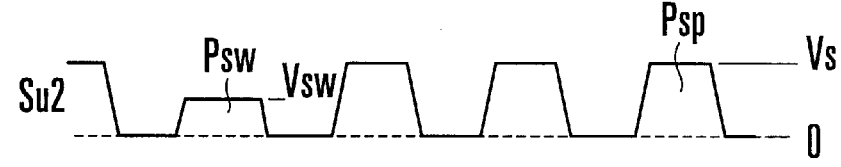
FIG. 5D Su2
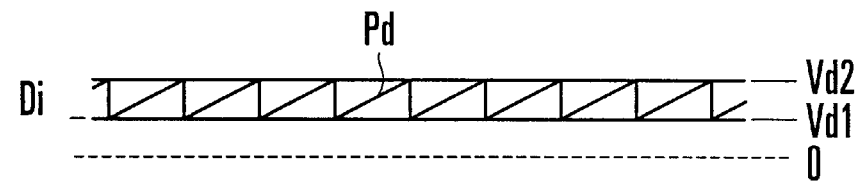
FIG. 5E Di

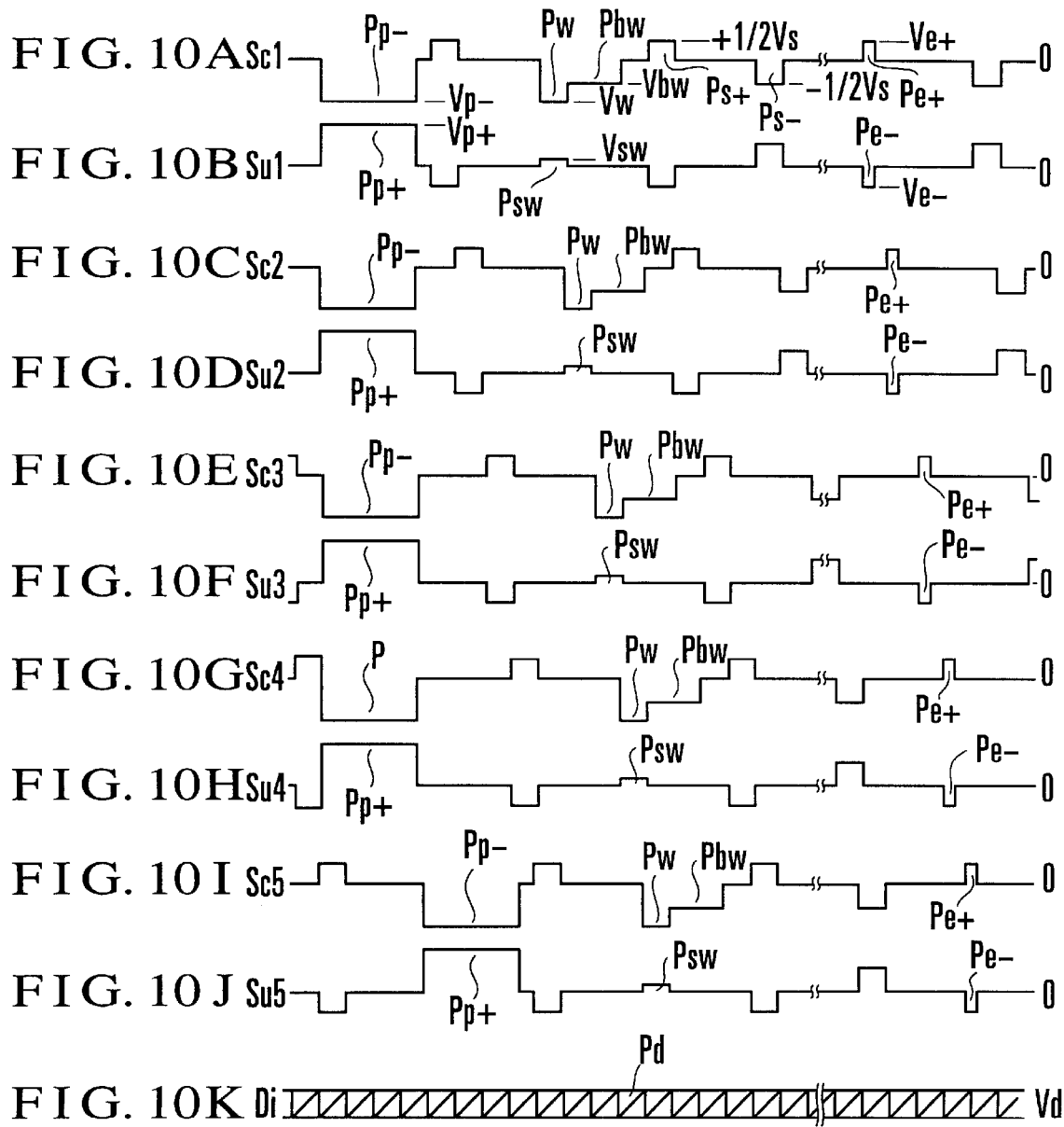

FIG. 16A PRIOR ART An(Di)
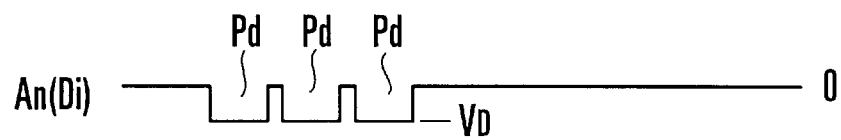
FIG. 16B PRIOR ART C1(Su1)
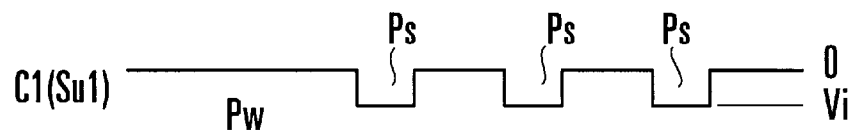
FIG. 16C PRIOR ART S1(Sc1)
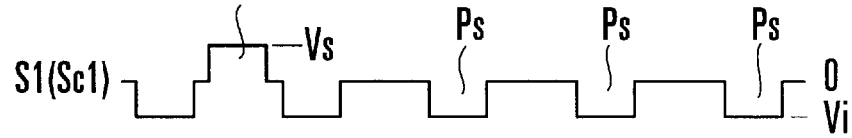
FIG. 16D PRIOR ART C2(Su2)
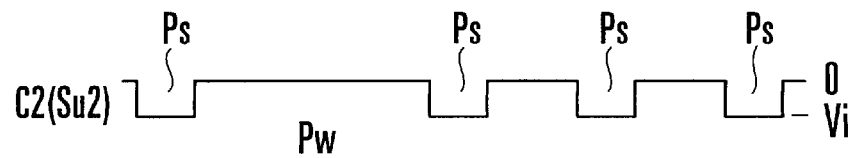
FIG. 16E PRIOR ART S2(Sc2)
FIG. 16F PRIOR ART C3(Su3)
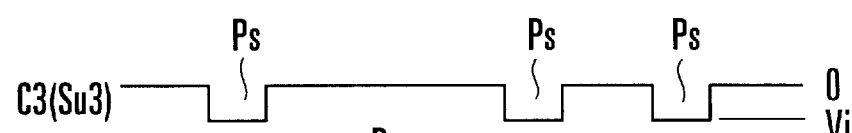
FIG. 16G PRIOR ART S3(Sc3)
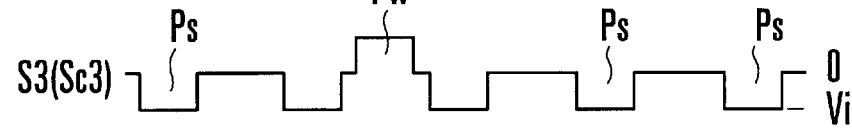

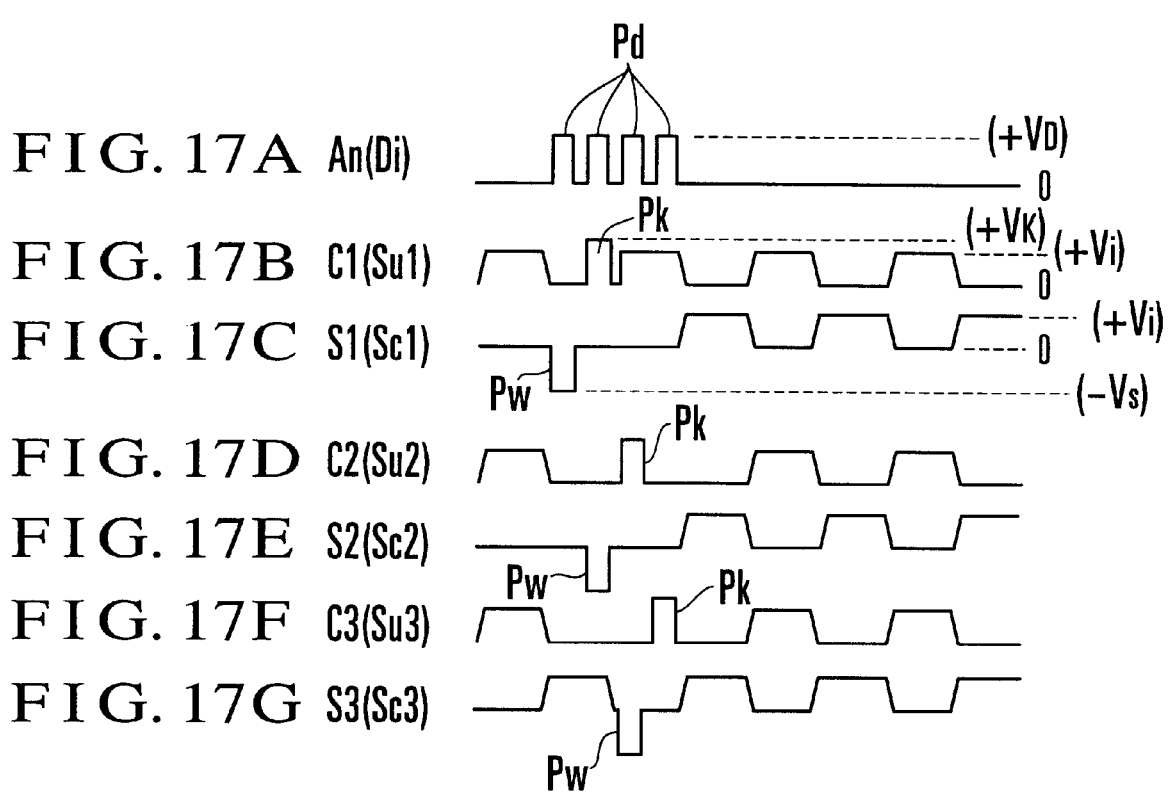

PLASMA DISPLAY AND METHOD OF DRIVING THE SAME

BACKGROUND OF THE INVENTION

The present invention relates to a plasma display and method of driving the same.

A plasma display (to be referred to as a PDP hereinafter) performs display on the basis of discharge emission, and hence can have a low-profile structure. In addition, the PDP can have a high display contrast and relatively large screen without any flicker. The PDP is of a spontaneous emission type having a high response speed and can perform multi-color emission by using phosphors. Owing to these characteristics, the PDP has recently been used in many fields, e.g., the field of display apparatuses associated with computers and the field of color image display.

Such PDPs are roughly classified, according to operation schemes, into AC discharge type PDPs in which electrodes are coated with dielectric layers and indirectly operated in an AC discharge state and DC discharge type PDPs in which electrodes are exposed in a discharge space and operated in a DC discharge state.

The AC discharge type PDPs are classified, according to driving schemes, into memory-driven PDPs designed to cause discharge by using the display information stored in memories mounted on panels themselves and refresh PDPs designed to repeatedly read out display information from external memories and output the information to panels so as to perform discharge display. The memory-driven PDPs suited for large-capacity display have currently become mainstream.

The brightness of the PDP is proportional to the number of times of discharge on the panel. In the refresh PDP, therefore, as the display capacity increases, the number of times of discharge decreases, resulting in a reduction in brightness. For this reason, the refresh operation scheme is used for PDPs with small display capacities.

FIG. 13 shows one display cell of a general AC discharge memory-driven PDP.

Referring to FIG. 13, a display cell 1 has insulating substrates 11 and 12 which are front and rear surfaces made of glass. Components such as electrodes are formed between the insulating substrates 11 and 12. More specifically, a scan electrode 13 and sustain electrode 14 which are made of transparent conductive films are selectively formed under the insulating substrate 11, and trace electrodes 15 and 16 made of metal conductive films are formed under the scan electrode 13 and sustain electrode 14 to reduce the resistances of the scan electrode 13 and sustain electrode 14. The scan electrode 13, sustain electrode 14, and trace electrodes 15 and 16 are covered with a transparent dielectric layer 20. A protective layer 21 made of a magnesium oxide is formed on the entire lower surface of the dielectric layer 20 to protect the dielectric layer 20 against discharge caused by a discharge gas.

A discharge gas space 18 filled with a discharge gas such as helium, neon, xenon, or a gas mixture thereof is formed under the protective layer 21. A phosphor 19 for converting ultraviolet rays produced by discharge caused by the discharge gas into visible light 23 is formed under the discharge gas space 18. A dielectric layer 22 is formed under the phosphor 19. A data electrode 17 is formed between the dielectric layer 22 and the insulating substrate 12.

Note that the scan electrode 13 in FIG. 13 corresponds to each of reference symbols Sc and Sc1 to Scm in each drawing to be described later. The sustain electrode 14 in FIG. 13 corresponds to each of reference symbols Su and Su1 to Sum in each drawing to be described later. The data electrode 17 in FIG. 13 corresponds to each of reference symbols Di and D1 to Dn in each drawing to be described later.

FIG. 14 shows the schematic arrangement of an AC discharge memory-driven PDP.

Referring to FIG. 14, the PDP is comprised of a panel 2 made up of display cells 1, each shown in FIG. 13, arranged in the form of a matrix, control circuit 3 for controlling the display operation of the panel 2, scan driver 4 for driving the scan electrodes Sc1 to Scm of the respective display cells 1, sustain driver 5 for driving the sustain electrodes Su1 to Sum of the respective display cells 1, and address driver 6 for driving the data electrodes D1 to Dn of the respective display cells 1.

The control circuit 3 is constituted by a frame memory 31 for storing display data, signal processing circuit 32 for performing signal processing and outputting the resultant data to the address driver 6, and driver control circuit 33 for controlling the scan driver 4 and sustain driver 5.

The panel 2 is a dot matrix display panel having the display cells 1 arranged on m rows and n columns. This panel has row electrodes constituted by the scan electrodes Sc1 to Scm and sustain electrodes Su1 to Sum which are parallel to each other, and column electrodes constituted by the data electrodes D1 to Dn crossing the electrodes Sc1 to Scm and Su1 to Sum at right angles. The display cells 1 are formed at the intersections of the row and column electrodes.

The scan electrode driving waveforms generated by the scan driver 4 are applied to the scan electrodes Sc1 to Scm. The sustain electrode driving waveforms generated by the sustain driver 5 are applied to the sustain electrodes Su1 to Sum. The data electrode driving waveforms generated by the address driver 6 are applied to the data electrodes D1 to Dn.

The signal processing circuit 32 of the control circuit 3 generates control signals for the scan driver 4 and sustain driver 5 on the basis of external fundamental signals (a vertical sync signal Vsync, horizontal sync signal Hsync, clock signal Clock, and data sync signal DATA). These control signals are supplied to the respective drivers 4 and 5 through the driver control circuit 33. The data to be displayed on the display cell 1 is extracted from the frame memory 31 by the signal processing circuit 32 in synchronism with the clock signal Clock and data sync signal DATA, and is supplied to the display cell 1 through the address driver 6.

The write discharge operation of the display cell 1 having the above arrangement will be described next.

So-called write discharge is caused in the display cell 1 in which a pulse voltage exceeding a discharge threshold is applied between the scan electrode 13 and the data electrode 17. At this time, since both the electrodes 13 and 17 are covered with the insulating layers, positive and negative charges are stored on the surfaces of the dielectric layers 20 and 22 on the two sides to generate wall charges. These wall charges decrease the effective voltage in the cell. As a consequence, the discharge in the cell is terminated within a short period of time.

In sustain discharge operation dominating emission display, a sustain pulse having the same polarity as that of the voltage based on the wall charges is applied between the adjacent scan electrode 13 and sustain electrode 14. With this operation, since the sustain pulse voltage is superimposed on the voltage based on the wall charges, even if the sustain pulse voltage is low, the resultant voltage exceeds the discharge threshold between the scan electrode 13 and the sustain electrode 14. As a consequence, discharge occurs. If, therefore, sustain pulses are kept alternately applied to the scan electrode 13 and sustain electrode 14, the discharge between the electrodes can be maintained.

Sustain discharge can be quickly stopped by applying a low-voltage pulse having a large pulse width which cancels out the voltage based on wall charges or erase pulse having a small pulse width and a voltage near the sustain pulse voltage to the scan electrode 13 or sustain electrode 14.

FIGS. 15A to 15F show the first conventional example of the driving operation of the AC discharge memory-driven PDP in FIG. 14. In the first conventional example, write discharge and sustain discharge are caused at different timings.

FIGS. 15A shows a sustain pulse Wc applied to the sustain electrodes Su1, Su2, . . . , Sum. FIGS. 15B to 15E show scan pulses Ws1 to Wsm (only the pulses Sw1 to Ws4 are shown) respectively applied to the scan electrodes Sc1, Sc2, . . . , Scm. FIG. 15F shows a data pulse Wd applied to a data electrode Di ($1 \leq i \leq n$).

One period (one subframe) of the driving operation of the panel 2 is constituted by four timings of priming discharge, write discharge, sustain discharge, and sustain discharge erase operation. Desired video display can be performed by repeating driving operation at each timing.

First of all, to obtain stable write discharge characteristics, priming discharge is caused to generate activated particles and wall charges in the discharge gas space. In this priming discharge, priming pulses Pp (FIG. 15A) are applied to make all the display cells of the panel 2 cause discharge at once, and priming erase pulses Ppe are simultaneously applied to the respective scan electrodes to eliminate charges, of the generated wall charges, which interfere with write discharge and sustain discharge (FIGS. 15B to 15E).

More specifically, the priming pulses Pp are applied to the sustain electrodes Su1, Su2, . . . , Sum of the respective display cells to make all the display cells cause discharge. Thereafter, the priming erase pulses Ppe are applied to the scan electrodes Sc1, Sc2, . . . , Scm to cause erase discharge to eliminate the wall charges stored upon application of the priming pulses Pp.

Subsequently, write discharge is performed. In write discharge, scan pulses Pw are sequentially applied to the scan electrodes Sc1, Sc2, . . . , Scm of the respective display cells 1 (FIGS. 15B to 15E). Data pulses Pd are selectively applied to the data electrodes Di ($1 \leq i \leq n$) of the cells to perform display in synchronism with the scan pulses Pw (FIG. 15F).

After the above write discharge, negative sustain pulses Pc are sequentially applied to a sustain electrode, scan electrode, sustain electrode, . . . in the order named so as to cause sustain discharge required to obtain desired brightness. To stop sustain discharge, erase pulses Pse (pulse width of about 0.5 μs to 1 μs) are applied to stop the erase pulses before sufficient wall charges for sustain discharge are formed. With this operation, subsequent sustain discharge is stopped.

FIGS. 16A to 16G show the second conventional example of the driving operation disclosed in Japanese Patent Laid-Open No. 7-162787. Similar to the first conventional example, the second conventional example is associated with an AC discharge memory-driven PDP. In this case, write discharge and sustain discharge are simultaneously controlled by different scan electrodes.

FIG. 16A shows a data pulse An applied to a data electrode Di ($1 \leq i \leq n$) of each display cell. FIGS. 16B, 16D, and 16F show sustain pulses C1, C2, C3, . . . , Cm (only the pulses C1 to C3 are shown) applied to sustain electrodes Su1, Su2, . . . , Sum of the respective display cells. FIGS. 16C, 16E, and 16G show scan pulses S1, S2, S3, . . . , Sm (only the pulses S1 to S3 are shown) respectively applied to the scan electrodes Sc1, Sc2, . . . , Scm.

In write discharge, scan pulses Pw are sequentially applied to the scan electrodes Sc1, Sc2, . . . , Scm of the respective display cells 1 (FIGS. 16C, 16E, and 16G). In synchronism with these scan pulses Pw, data pulses Pd are selectively applied to the data electrodes Di ($1 \leq i \leq n$) of the cells selected for display (FIG. 16A). With this operation, write discharge is caused in the cells selected for display to generate wall charges. Sustain pulses Ps are sequentially applied to the respective scan electrodes having undergone write discharge in the order of a sustain electrode, scan electrode, sustain electrode, . . . , thereby maintaining sustain discharge.

In the second conventional example, since pixel data pulses can be applied while sustain pulses are applied to electrodes other than electrodes for a write, the write cycle of pixel data can be shortened without shortening the pulse width of each scan pulse and the pulse width of each sustain pulse.

In the second conventional example, the voltage used to cause write discharge is the sum of a scan pulse voltage VS and data pulse voltage VD, and hence must be higher than the discharge start voltage between a scan electrode Y and data (column) electrode D and high enough to generate sufficient wall charges for a shift to sustain discharge.

In general, data pulses are repeatedly turned on and off with respect to all scanning lines, whereas scan pulses are generated one by one for each scan line every time display image is updated. For this reason, the power consumption associated with data pules is much higher than that associated with scan pulses. For this reason, a method of increasing the scan pulse voltage as high as possible and decreasing the data pulse voltage is used. In order to increase the scan pulse voltage, however, a driving circuit with a high breakdown voltage is required. Such a driving circuit is expensive, and hence the cost of a display apparatus increases.

FIGS. 17A to 17G show the third conventional example of the driving operation disclosed in Japanese Patent Laid-Open No. 6-337654. The third conventional example is associated with an AC discharge memory-driven PDP, in which wall charges are generated by applying wall charge generation pulses to sustain electrodes immediately after write discharge.

FIGS. 17B, 17D, and 17F show sustain pulses C1, C2, C3, . . . , Cm (only the pulses C1 to C3 are shown) commonly applied to sustain electrodes Su1, Su2, . . . , Sum of display cells 1. FIGS. 17C, 17E, and 17G show scan pulses S1, S2, S3, . . . , Sm (only the pulses S1 to S3 are shown) respectively applied to scan electrodes Sc1, Sc2, . . . , Scm of the respective display cells 1. FIGS. 17A shows a data pulse An applied to a data electrode Di ($1 \leq i \leq n$) of each display cell 1.

In write discharge, scan pulses Pw are sequentially applied to the respective scan electrodes Sc1, Sc2, . . . , Scm (FIGS. 17C, 17E, and 17G). In synchronism with these scan pulses Pw, data pulses Pd are selectively applied to data electrodes Di ($1 \leq i \leq n$) of the display cells selected for display (FIG. 17A). Wall charge generation pulses Pk, each having a polarity opposite to that of the scan pulse Pw, are applied to the sustain electrodes Su1, Su2, . . . , Sum immediately after the application of the scan pulses Pw (FIGS. 17B, 17D, and 17F), thereby generating wall charges.

In the third conventional example, in write discharge operation, a pulse for causing discharge between a data (column) electrode and a scan (Y) electrode is separated from a pulse for generating wall charges between the scan (Y) electrode and a sustain (X) electrode. For this reason, the write cycle of image data can be shortened by decreasing the pulse width of each scan pulse.

In the third conventional example, as in the second conventional example, since the voltage for causing write discharge is the sum of a scan pulse voltage VS and data pulse voltage VD, this voltage must be set to be higher than the discharge start voltage between the scan electrode Y and the data (column) electrode D.

To solve this problem, a method of increasing the scan pulse voltage as high as possible and decreasing the data pulse voltage is used. In order to increase the scan pulse voltage, however, a driving circuit with a high breakdown voltage is required. Such a driving circuit is expensive, and hence the cost of a display apparatus increases.

As described above, in the first conventional example in which write discharge and sustain discharge are caused at different timings, although scan pulses and data pulses are simultaneously applied, sustain pulses and data pulses are not simultaneously applied. For this reason, write discharge and sustain discharge can be caused independently, and hence discharge can be stably controlled. However, since sustain discharge periods cannot be used as write discharge periods, the use of write discharge periods is limited. This makes it difficult to realize a high-resolution panel and multilevel gray-scale display while properly coping with high frame frequencies.

In the second and third conventional examples in which write discharge and sustain discharge are simultaneously controlled by using different scan electrodes, since sustain discharge periods can also be used as write discharge periods, the write discharge periods can be prolonged. However, since a driving circuit with a high breakdown voltage is required for write discharge, the cost of the system increases.

SUMMARY OF THE INVENTION

It is an object of the present invention to provide a plasma display which improves write discharge and sustain discharge characteristics and driving method for the display.

It is another object of the present invention to provide a plasma display which can be realized by an inexpensive driving circuit, and driving method for the display.

In order to achieve the above objects, according to the present invention, there is provided a plasma display comprising a matrix electrode section including a plurality of scan electrodes, a plurality of sustain electrodes arranged parallel to the scan electrodes, and a plurality of data electrodes crossing the scan and sustain electrodes at right angles, a plurality of display cells formed at the intersections of the scan electrodes, the sustain electrodes, and the data electrodes, and a plurality of driving means connected to the scan electrodes, the sustain electrodes, the data electrodes to drive the display cells, each of the driving means including first and second switching means for alternately applying first and second sustain pulses respectively having positive and negative potentials with respect to a reference potential of the data electrode to the scan and sustain electrodes such that a potential relationship between the scan and sustain electrodes is periodically reversed, third switching means for applying a scan pulse having a negative potential higher than the potential of the second sustain pulse to the scan electrode to superimpose the scan pulse on the second sustain pulse, fourth switching means for applying a semi-selection pulse having a potential lower than the potential of the first sustain pulse to the sustain electrode corresponding to the scan electrode when a scan pulse is applied to the scan electrode, and fifth switching means for selectively applying a data pulse having a positive potential with respect to the reference potential of the data electrode to the data electrode in accordance with a timing at which a scan pulse is applied to the scan electrode.

BRIEF DESCRIPTION OF THE DRAWINGS

FIGS. 5A to 5E are timing charts showing an example of the driving operation of the driving circuit in FIG. 4;

FIGS. 10A to 10K are timing charts showing an example of the driving operation of the driving circuit in FIG. 9;

FIGS. 16A to 16G are timing charts showing the second example of conventional PDP driving; and FIGS. 17A to 17G are timing charts showing the third example of conventional PDF driving.

DESCRIPTION OF THE PREFERRED EMBODIMENT

The present invention will be described in detail below with reference to the accompanying drawings.

Figure 1:
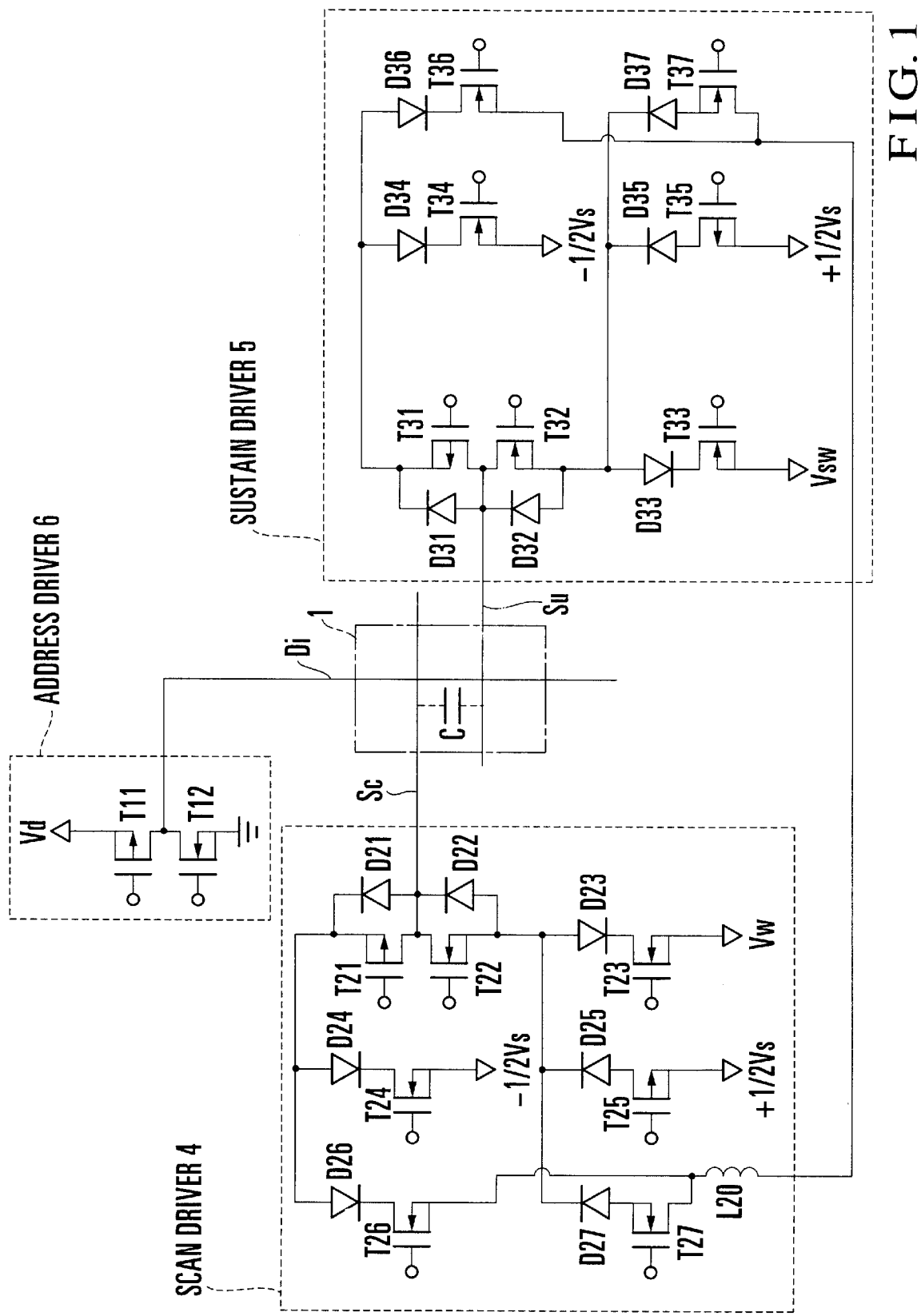
FIG. 1 is a circuit diagram showing the driving circuit of a PDP according to the first embodiment of the present invention.
Figure 14:
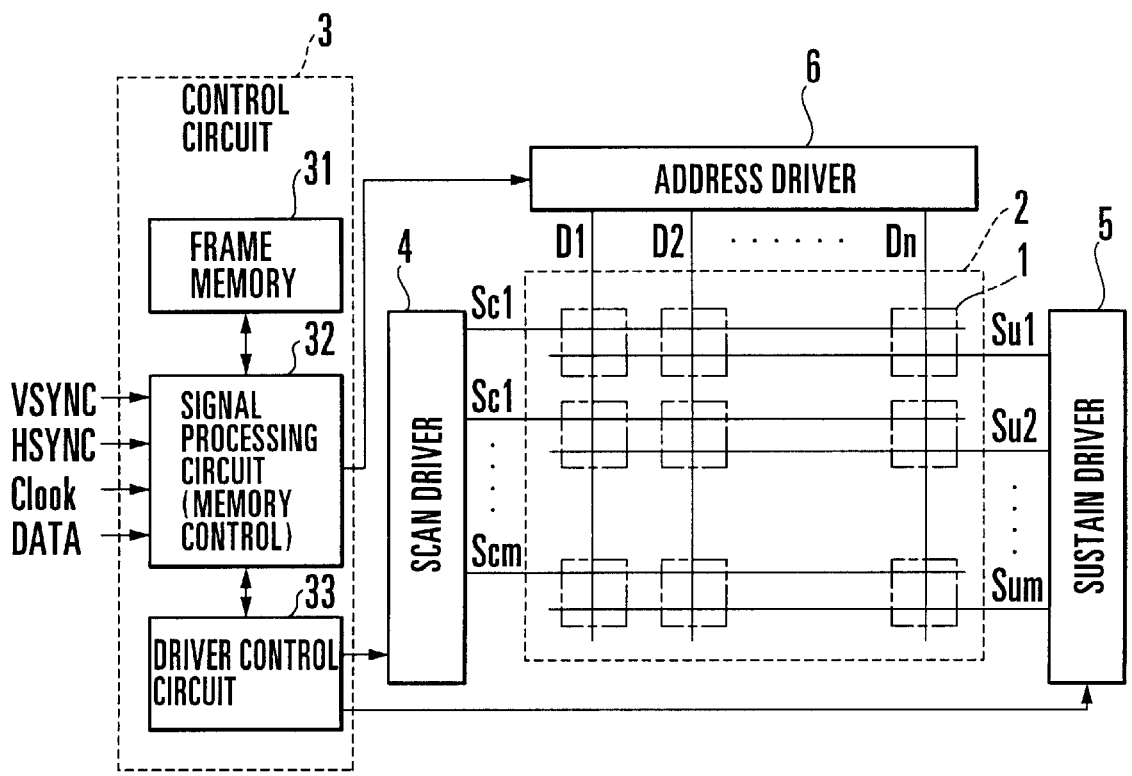
FIG. 14 is a block diagram showing the schematic arrangement of the PDP.
Figures 15A, 15B, 15C, 15D, 15E, 15F:
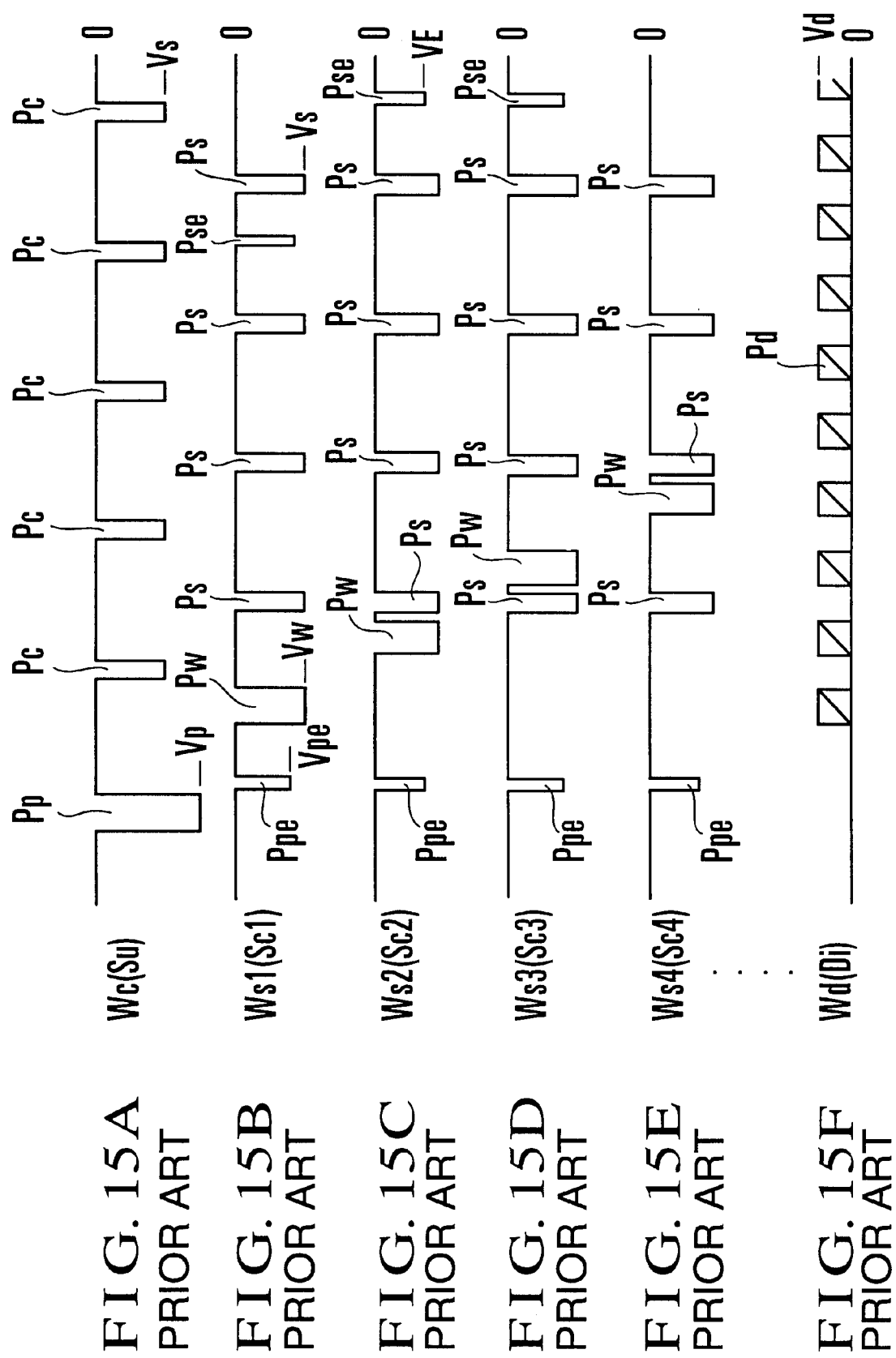
FIGS. 15A to 15F are timing charts showing the first example of conventional PDP driving.

FIG. 1 shows the driving circuit of a plasma display according to the first embodiment of the present invention, and more specifically, the detailed arrangements of a scan driver 4, sustain driver 5, and address driver 6 which are used to drive the AC discharge memory-driven PDP shown in FIG. 14.

Referring to FIG. 1, the scan driver 4 for driving a scan electrode Sc of a display cell 1 is made up of MOS (Metal Oxide Semiconductor) field effect transistors (to be referred to as transistors hereinafter) T21 to T27, diodes D21 to D27, and a coil L20. The transistors T21 and T22 are connected in series, and the diodes D21 and D22 are connected in parallel with the transistors T21 and T22. The node between the transistors T21 and T22 is connected to the display cell 1 through the scan electrode Sc.

One terminal of the series circuit of the transistors T21 and T22 is connected to a voltage −1/2Vs through the diode D24 and transistor T24 and is also connected to one terminal of the coil L20 through the diode D26 and transistor T26. The other terminal of the series circuit of the transistors T21 and T22 is connected to a voltage Vw through the diode D23 and transistor T23, to a voltage +1/2Vs through the diode D25 and transistor T25, and to one terminal of the coil L20 through the diode D27 and transistor T27. The other terminal of the coil L20 is connected to the sustain driver 5.

The sustain driver 5 for driving a sustain electrode Su of the display cell 1 is made up of transistors T31 to T37 and diodes D31 to D37. The transistors T31 and T32 are connected in series, and the diodes D31 and D32 are connected in parallel with the transistors T31 and T32. The node between the transistors T31 and T32 is connected to the display cell 1 through the sustain electrode Su.

One terminal of the series circuit of the transistors T31 and T32 is connected to a voltage −1/2Vs through the diode D34 and transistor T34 and is also connected to the other end of the coil L20 through the diode D36 and transistor T36. The other terminal of the series circuit of the transistors T31 and T32 is connected to a voltage Vsw through the diode D33 and transistor T33, to a voltage +1/2Vs through the diode D35 and transistor T35, and to the other terminal of the coil L20 through the diode D37 and transistor T37.

The address driver 6 for driving a data electrode Di of the display cell 1 is made up of transistors T11 and T12. The transistor T11 and T12 are connected in series between a voltage Vd and ground. The node between the transistors T11 and T12 is connected to the display cell 1 through the data electrode Di.

The scan driver 4, sustain driver 5, and address driver 6 generate a scan pulse Pw, positive and negative sustain pulses Ps+ and Ps−, and data pulse Pd shown in FIGS. 2A to 2E and 3A to 3K in the manner described later to selectively drive the respective electrodes Sc, Su, and Di of the display cell 1.

The operation of the driving circuit shown in FIG. 1 will be described next.

The address driver 6 for driving the data electrode Di outputs the data pulse Pd (voltage: Vd) by turning on the transistor T11 and turning off the transistor T12. The address driver 6 stops outputting the data pulse Pd by turning off the transistor T11 and turning off the transistor T12.

The scan driver 4 for driving the scan electrode Sc outputs the negative sustain pulse Ps− (voltage: −1/2Vs) to the scan electrode Sc through the diodes D21 and D24 by turning on the transistor T24. At the same time, the sustain driver 5 outputs the positive sustain pulse Ps+ (voltage: +1/2Vs) to the sustain electrode Su through the diodes D32 and D35 by turning on the transistor T35.

A transition from the positive sustain pulse Ps+ to the negative sustain pulse Ps− and a transition from the negative sustain pulse Ps− to the positive sustain pulse Ps+ are made by recovering/using energy, using a circuit called a power (charge) recovery circuit based on an LC resonance circuit made up of a reference panel electrostatic capacitance C and the coil L20 circuit called a power (charge) recovery circuit based on an LC resonance circuit made up of a reference panel electrostatic capacitance C and the coil L20 circuit called a power (charge) recovery circuit based on an LC resonance circuit made up of a reference panel electrostatic capacitance C and the coil L20, as disclosed in Japanese Patent Laid-Open No. 8-152865.

In this case, a transition from the negative sustain pulse Ps− to the positive sustain pulse Ps+ at the scan electrode Sc and a transition from the positive sustain pulse Ps+ to the negative sustain pulse Ps− at the sustain electrode Su are made by turning on the transistor T27 of the scan driver 4 and the transistor T36 of the sustain driver 5.

When the transistors T27 and T36 are turned on, a current flows from the sustain electrode Su to the scan electrode Sc through the diodes D31 and D36, transistor T36, coil L20, transistor T27, and diodes D27 and D22 owing to the charges stored in the panel electrostatic capacitance C. As a consequence, electric charges of the opposite polarity are stored in the panel electrostatic capacitance C. With this operation, the potential of the scan electrode Sc almost shifts to that of the positive sustain pulse, and the potential of the sustain electrode Su almost shifts to that of the negative sustain pulse.

The low-impedance transistor T25 of the scan driver 4 for supplying a sustain emission current is turned on to output the positive sustain pulse Ps+(voltage: +1/2Vs) to the scan electrode Sc through the diodes D25 and D22. At the same time, the low-impedance transistor T34 of the transistor is turned on to output the negative sustain pulse Ps− (voltage: −1/2Vs) to the sustain electrode Su through the diode D34 and D31.

A transition from the positive sustain pulse Ps+ to the negative sustain pulse Ps− at the scan electrode Sc and a transition from the negative sustain pulse Ps− to the positive sustain pulse Ps+ at the sustain electrode Su are made by turning on the transistor T26 of the scan driver 4 and the transistor T36 of the sustain driver 5.

When the transistors T26 and T37 are turned on, a current flows from the scan electrode Sc to the sustain electrode Su through the diodes D21 and D26, transistor T26, coil L20, transistor T37, diode D37, and transistor T31 owing to the charges stored in the panel electrostatic capacitance C. As a consequence, electric charges of the opposite polarity are stored in the panel electrostatic capacitance C. With this operation, the potential of the scan electrode Sc of the display cell 1 almost shifts to that of the negative sustain pulse, and the potential of the sustain electrode Su almost shifts to that of the positive sustain pulse.

The low-impedance transistor T24 for supplying a sustain emission current is turned on to output the negative sustain pulse Ps− (voltage: −1/2Vs) to the scan electrode Sc through the diodes D24 and D21. At the same time, the low-impedance transistor T35 is turned on to output the positive sustain pulse Ps+ (voltage: +1/2Vs) to the sustain electrode Su through the diodes D35 and D32.

In the scan driver 4, when the transistors T22, T23, and T24 are turned on, the scan electrode Sc of the display cell 1 is set at a potential −1/2Vs through the diodes D24 and D21. In this state, the scan pulse Pw (voltage: Vw) is output to the scan electrode Sc through the diode D23 and transistors T22 and T24. Note that since the scan pulse Pw is superimposed on the negative sustain pulse Ps–, it suffices if the breakdown voltage of each of the transistors T21 and T22 and diodes D21 and D22 is equal to or more than the potential difference between the voltages Vw and 1/2Vs.

If the transistors T32 and T33 of the sustain driver 5 are turned on to generate a semi-selection pulse, a semi-selection pulse Psw (voltage: Vsw) is output to the sustain electrode Su through the diode D33 and transistors T32 and T33.

According to this embodiment, the positive sustain pulse Ps+ and negative sustain pulse Ps– are respectively applied to the scan electrode Sc and sustain electrode Su, and the negative sustain pulse Ps– is superimposed on the scan pulse Pw and applied to the scan electrode Sc. In addition, the data pulse Pd and semi-selection pulse Psw can be respectively applied to the data electrode Di and sustain electrode Su.

FIGS. 2A to 2E show an example of the driving operation of the driving circuit in FIG. 1.

Figure 2:
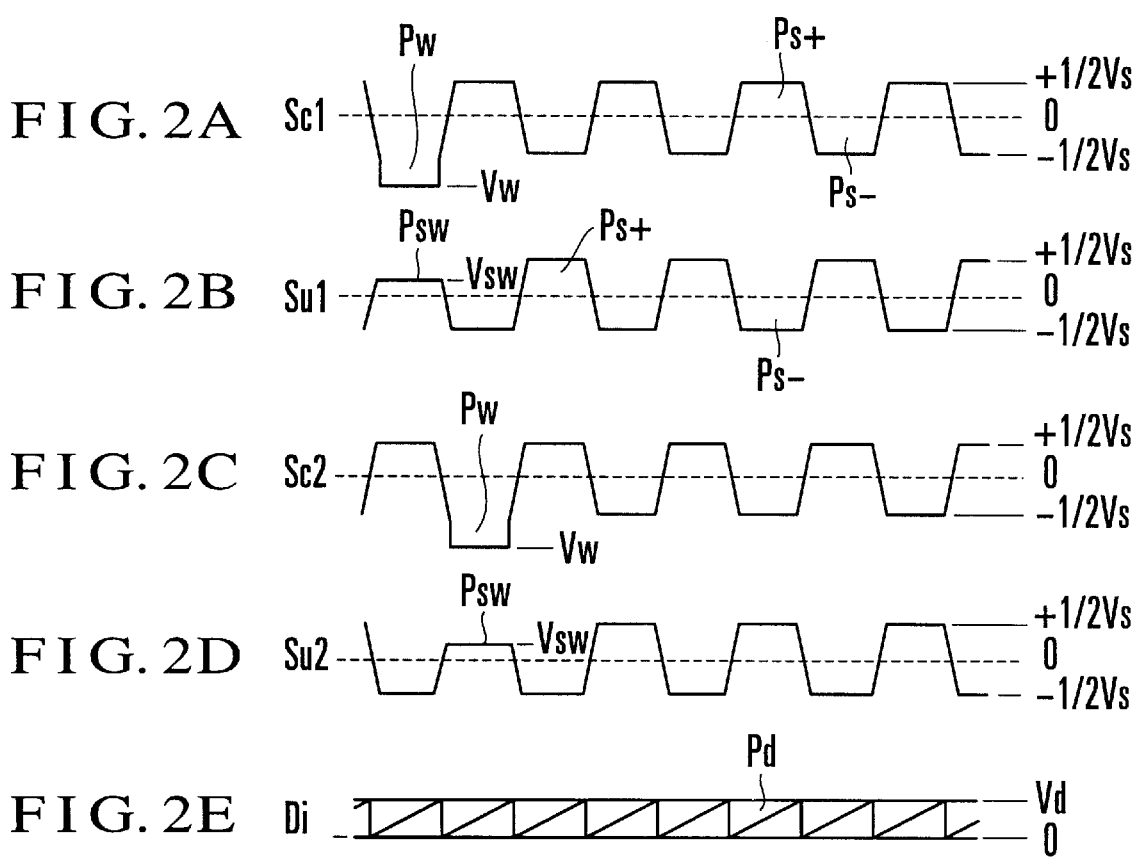
FIGS. 2A to 2E are timing charts showing the first example of the driving operation of the driving circuit in FIG. 1.

As shown in FIG. 2A, the negative sustain pulse Ps– (voltage: 1/2Vs) with a voltage almost ½ a sustain discharge voltage Vs and the positive sustain pulse Ps+ (voltage: +1/2Vs) with a voltage almost ½ the sustain discharge voltage Vs are alternately applied to an odd-numbered scan electrode Sc1. As shown in FIG. 2B, the negative sustain pulse Ps– and positive sustain pulse Ps+ which are 180° out of phase with those applied to the odd-numbered scan electrode Sc1 are applied to an odd-numbered sustain electrode Su1.

As shown in FIG. 2C, the positive and negative sustain pulses Ps+ and Ps– which are in phase with those applied to the odd-numbered sustain electrode Su1 are applied to an even-numbered scan electrode Sc2. As shown in FIG. 2D, the positive and negative sustain pulses Ps+ and Ps– which are in phase with those applied to the odd-numbered scan electrode Sc1 are applied to an even-numbered sustain electrode Su2.

In this case, the scan pulse Pw (voltage: Vs) is sequentially applied (FIGS. 2A and 2C) to be superimposed on the negative sustain pulse Ps– applied to the scan electrode Sc at the same timing. The semi-selection pulse Psw (voltage: Vsw) is applied (FIGS. 2B and 2D) to the sustain electrode Su corresponding to the scan electrode Sc, to which the scan pulse Pw is applied, at the timing at which the scan pulse Pw is applied. In addition, the data pulse Pd (voltage: Vd) is selectively applied (FIG. 2E) to the data electrode Di in accordance with the timing of the scan pulse Pw.

Note that the data pulse Pd in FIG. 2E changes at the same timing as that of the rising and leading edges of the sustain pulses Ps+ and Ps–. This eliminates the idle times between the data pulses Pd and the necessity to restore the ground (GND) potential when the data pulses Pd are continuously output. Therefore, the charge/discharge (reactive) current in the panel electrostatic capacitance C can be reduced.

The driving operation of the plasma display according to this example of driving will be described next. Although the operation associated with the scan electrode Sc1 and sustain electrode Su1 of the display cell 1, which correspond to each other, will be described below, the same applies to the pairs of scan and sustain electrodes of the remaining display cells.

Before write discharge, almost no wall charge exists in the scan electrode Sc1, sustain electrode Su1, and data electrode Di. For this reason, a negative sustain pulse Ps– voltage of about –90 V (or positive sustain pulse Ps+ voltage) at the scan electrode Sc1 and a positive sustain pulse Ps+ voltage of about +90V (or negative sustain pulse Ps– voltage) at the sustain electrode Su1 do not exceed the discharge threshold voltage between the scan electrode Sc1 and the sustain electrode Su1, and hence no sustain discharge occurs.

Assume that the voltage of the data pulse Pd (about 70 V) at another scan electrode Sc, which is used to cause write discharge in the display cell 1, is applied to the data electrode Di. In this case as well, the voltage of this data pulse Pd and the negative sustain pulse Ps– voltage at the scan electrode Sc1 or negative sustain pulse Ps– voltage at the sustain electrode Su1 do not exceed the discharge threshold voltage, and hence no discharge occurs between the scan electrode Sc1 and the sustain electrode Su1.

In the display cell 1 to be selected, the scan pulse Pw (about –170 V) and data pulse Pd (about 70 V) respectively applied to the scan electrode Sc1 and data electrode Di exceed the discharge threshold voltage between the scan electrode Sc1 and the data electrode Di. As a consequence, write discharge occurs, and positive and negative charges are respectively generated as wall charges on the scan electrode Sc1 side and data electrode Di side. Discharge is also induced between the scan electrode Sc1 and the sustain electrode Su1 to generate negative charges on the sustain electrode Su1 side. The semi-selection pulse Psw (about 10 V) is applied to the sustain electrode Su1 to reliably induce discharge.

These operations can be implemented by setting the display cell to satisfy the following inequalities:

$$Vfcu > |+1/2Vs| + |-1/2Vs| \qquad (1)$$

$$Vw + Vd > Vfcd > |-1/2Vs| + Vd \qquad (2)$$

$$Vfud > |-1/2Vs| + Vd \qquad (3)$$

where Vfcu is the discharge start voltage between the scan electrode Sc1 and the sustain electrode Su1, Vfcd is the discharge start voltage between the scan electrode Sc1 and the data electrode Di, and Vfud is the discharge start voltage between the sustain electrode Su1 and the data electrode Di.

In the display cell 1 in which write discharge has occurred, the voltage based on the positive charges on the scan electrode Sc side and voltage based on the negative charges on the sustain electrode Su1, which are generated in write discharge, are respectively superimposed on the positive sustain pulse Ps+ voltage (about 90 V) at the scan electrode Sc1 and negative sustain pulse Ps– voltage (about –90 V) at the sustain electrode Su1 after the write discharge. Since these superimposed voltages exceed the discharge threshold voltage between the scan electrode Sc1 and the sustain electrode Su1, sustain discharge occurs. As a result, negative and positive charges are respectively generated on the scan electrode Sc1 side and sustain electrode Su1 side.

In this case, even if the data pulse Pd for another scan electrode is applied to the data electrode Di, since negative charges are generated on the data electrode Di side after write discharge, the discharge threshold voltage between the sustain electrode Su1, to which the negative sustain pulse Ps– is applied, and the data electrode Di is not exceeded. Hence, the sustain discharge characteristics are not impaired.

At the next sustain pulse, the negative sustain pulse Ps– voltage (about –90 V) at the scan electrode Sc1 and the positive sustain pulse Ps+ voltage (about 90 V) at the sustain electrode Su1 are respectively superimposed on the negative and positive charges generated on the scan electrode Sc1 side and sustain electrode Su1 side by the preceding sustain discharge. In this case, as in the case of the preceding sustain discharge, the sustain discharge characteristics are not impaired by the application of the data pulse Pd.

Subsequently, the sustain discharge is maintained by alternately applying the positive sustain pulse Ps+ and negative sustain pulse Ps– to the scan electrode Sc1 and sustain electrode Su1 of the display cell 1. The above operations are sequentially performed in units of scan electrodes Sc to cause write discharge and sustain discharge in each display cell 1 on the entire panel surface.

As described above, according to this embodiment, the scan pulse Pw is superimposed on the negative sustain pulse Ps– at the same timing, and the phases of sustain pulses between the odd-numbered scan electrode Sc1 and even-numbered scan electrode Sc2 are shifted from each other by 180°, thereby continuously applying the scan pulse Pw without any idle period.

In addition, with the use of the positive sustain pulse Ps+ (+1/2Vs) and negative sustain pulse Ps– (–1/2Vs) as sustain pulses, the potential difference between the data electrode Di and the scan electrode Sc or sustain electrode Su during a sustain discharge period is reduced. This makes it possible to suppress unnecessary discharge between the data electrode Di and the scan electrode Sc or sustain electrode Su, thus allowing a write discharge period and sustain discharge period to coexist while stabilizing each discharge operation. As a consequence, the use efficiency of this display in write discharge periods improves.

Furthermore, since the idle times between data pulses can be eliminated, there is no need to restore the ground (GND) potential when the data pulses Pd are continuously output. Therefore, the charge/discharge (reactive) current in the panel electrostatic capacitance C can be reduced.

FIGS. 3A to 3K shows the second example of the driving operation of the driving circuit in FIG. 1. Since the sustain pulses Ps+ and Ps– applied to the odd-numbered scan electrodes Sc1, Sc3, Sc5, and Sc7, even-numbered scan electrodes Sc2, Sc4, Sc6, and Sc8, odd-numbered sustain electrode Su1, and even-numbered sustain electrode Su2 are the same as those in the example of driving shown in FIGS. 2A to 2E, a description thereof will be omitted.

In this example of driving, as in the first example of driving, the scan pulse Pw (voltage: Vw) is superimposed on the negative sustain pulse Ps– at the scan electrode Sc. In this case, four scan pulses Pw (voltage: Vw) are sequentially applied at different timings within the application period of one negative sustain pulse Ps– (FIGS. 3A, 3E, and 3G, 3I; FIGS. 3C, 3F, 3H, and 3J).

Figure 3:
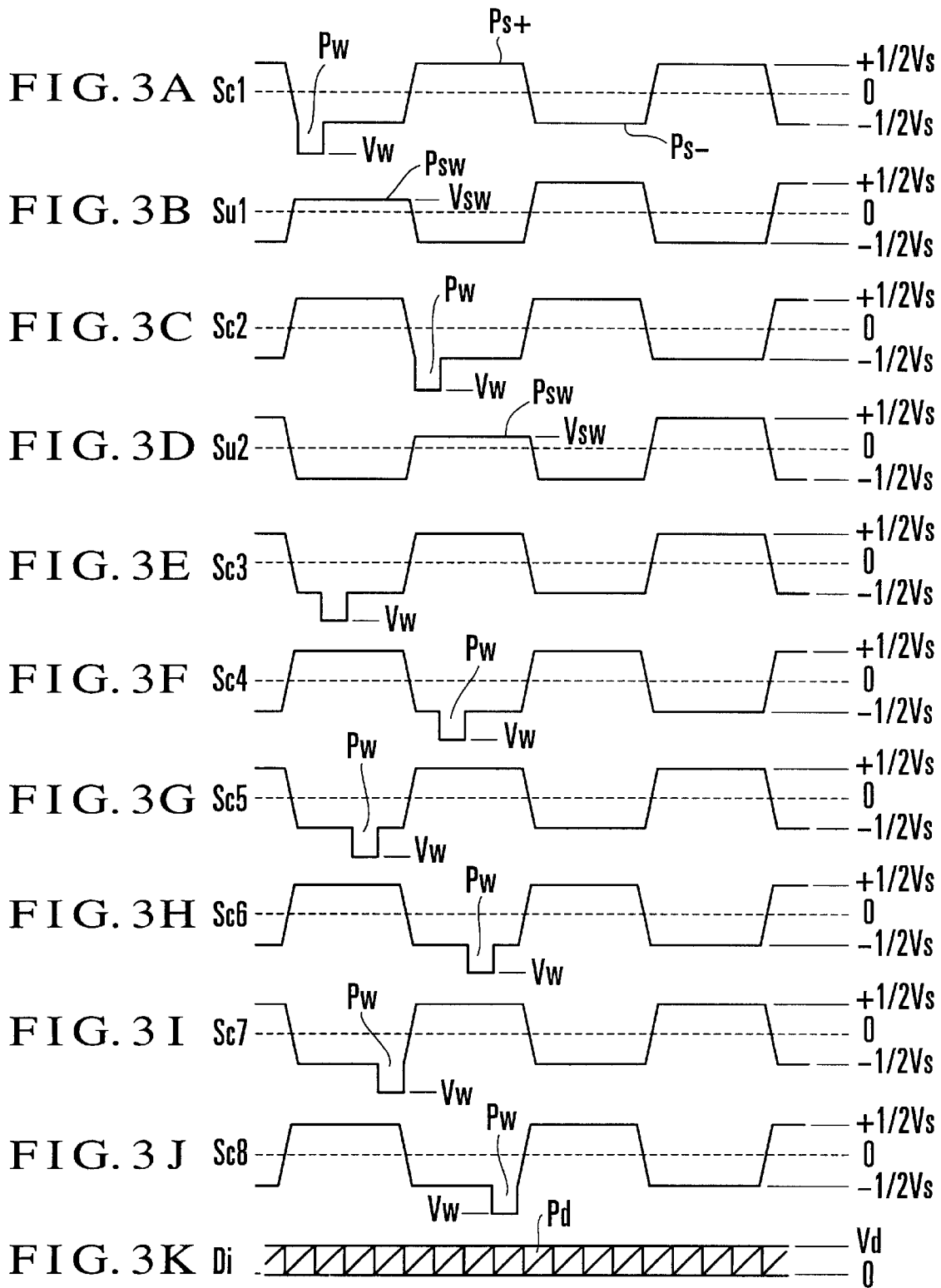
FIGS. 3A to 3K are timing charts showing the second example of the driving operation of the driving circuit in FIG. 1.

The semi-selection pulse Psw (voltage: Vsw) is applied to the sustain electrode Su, which corresponds to the scan electrode Sc to which the scan pulse Pw is applied, at the timing at which the negative sustain pulse Ps– is applied (FIGS. 3B and 3D). Note that a description of the timings at which pulses are applied to the sustain electrodes Su3 to Su8 corresponding to the scan electrodes Sc3 to Sc8 will be omitted.

The data pulse Pd (voltage: Vd) is selectively applied to the data electrode Di at the same timing as the application timing of the scan pulse Pw (FIG. 3K). If the idle times between the data pulses Pd are eliminated, there is no need to restore the ground (GND) potential when the data pulses Pd are continuously output. This makes it possible to reduce the charge/discharge (reactive) current in the panel electrostatic capacitance C as in the example of driving in FIGS. 2A to 2E.

In this example of driving, first of all, writing discharge is caused by respectively applying the scan pulse Pw (about –170 V), semi-selection pulse Psw (about 10 V), and data pulse Pd (about 70 V) to the scan electrode Sc1, sustain electrode Su1, and data electrode Di. With this operation, positive and negative charges are respectively generated on the scan electrode Sc side and sustain electrode Su side of the display cell 1.

Similar write discharge is sequentially caused in scan electrodes Sc3, Sc5, and Sc7 to generate positive charges on the scan electrode Sc sides of the display cells 1 and negative charges on the sustain electrode Su sides and data electrode Di sides of the display cells 1. Similar write discharge is sequentially caused in the scan electrodes Sc2, Sc4, Sc6, and Sc8, and sustain discharge is started in the four sustain electrodes at the same timing. This operation is repeated. As described above, write discharge is caused in four scan electrodes, and sustain discharge is started in sustain electrodes at the same time. This operation is repeated by the number of times corresponding to the number of scan electrodes.

Unnecessary discharge between the data pulse Pd at a given scan electrode and the data pulse Pd at another scan electrode does not occur as in the first example of driving. In the second example of driving, a plurality of scan pulses Pw are applied to the negative sustain pulse Ps–. However, since there is no idle period between the scan pulses Pw, the use efficiency of this display in terms of time improves as in the first example of driving.

According to the second example of driving, the following effect can also be expected.

In general, in driving operation requiring a high-resolution panel (having many scan electrodes) or multilevel gray-scale display (having many subfields), if the scan pulse width is 2 to 4 $\mu$s or less (480 scan electrodes), and 256 (=$2^8$)-level gray-scale display (8 subfields) is performed at 4 $\mu$s, the scan time becomes 15.36 ms. With a frame frequency of 60 Hz (=16.7 ms) in TV display, most of the frame time is occupied by the scan period. In this case, in the first example of driving, the sustain pulse width is also 2 to 4 $\mu$s or less.

In a plasma display, however, as the sustain pulse frequency increases (about 100 kHz or more: sustain pulse width of 5 $\mu$s or less), fluorescence or gas light emission is saturated. As a consequence, the luminous brightness does not increase in proportion to the number of sustain pulses. As the sustain pulse width decreases and the sustain pulse frequency increases, therefore, the luminous efficacy decreases. In the second example of driving, since the number of scan pulses can be increased while the sustain pulse frequency is kept at an appropriate value unlike in the first example of driving, high-definition panel and multilevel gray-scale display can be appropriately realized, and the luminous efficacy of the PDP can be increased.

In the second example of driving, four scan pulses are sequentially applied to the negative sustain pulse Ps– at the scan electrode Sc. Obviously, however, even if two or more scan pulses are applied, a similar effect can be obtained.

In the second example of driving, the semi-selection pulse Psw is applied at the same timing as the application timing of the negative sustain pulse Ps–. However, even if the semi-selection pulse Psw is applied at the same timing as that of the scan pulse width, and the remaining time is allocated to the negative sustain pulse potential (voltage: –1/2Vs) or positive sustain pulse potential (voltage: 1/2Vs), since discharge occurs between the scan electrode Sc and the sustain electrode Su in a write discharge period of the display cell 1, a similar effect can be obtained.

Figure 4:
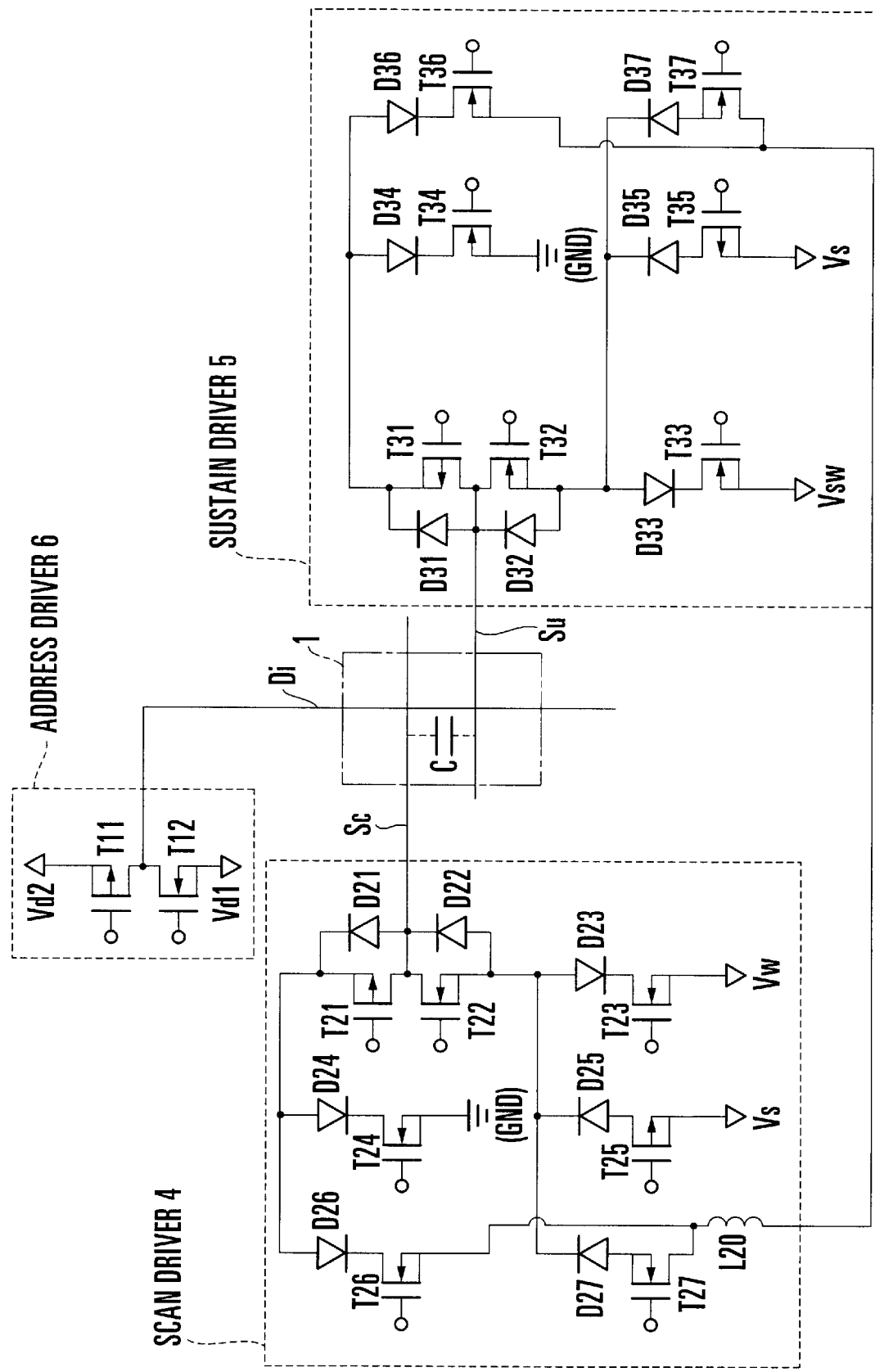
FIG. 4 is a circuit diagram showing the driving circuit of a PDP according to the second embodiment of the present invention.

FIG. 4 shows the driving circuit of a PDP according to the second embodiment of the present invention, and more specifically, the detailed arrangements of a scan driver 4, sustain driver 5, and address driver 6 which are used to drive the AC discharge memory-driven PDP shown in FIG. 14.

The driving circuit shown in FIG. 4 has a power supply arrangement in which the driving waveforms for a scan electrode Sc, sustain electrode Su, and data electrode Di are shifted in the positive potential direction by 1/2Vs with respect to those in the driving circuit shown in FIG. 1. In the scan driver 4, one terminal of the series circuit of transistors T21 and T22 is connected to signal ground (GND) through a diode D24 and transistor T24. The other terminal of the series circuit of the transistors T21 and T22 is connected to a voltage +1/2Vs through a diode D25 and transistor T25.

In the sustain driver 5, one terminal of the series circuit of transistors T31 and T32 is connected to ground (GND) through a diode D34 and transistor T34. The other terminal of the series circuit of the transistors T31 and T32 is connected to a voltage Vs through a diode D35 and transistor T35. In the address driver 6, the series circuit of transistors T11 and T12 is connected between voltages Vd2 and Vd1.

FIGS. 5A to 5E show an example of the driving operation of the driving circuit in FIG. 4.

In this example of driving, positive sustain pulses Psp (voltage: Vs) are alternately applied to the scan electrode Sc and sustain electrode Su. Scan pulses Pw (voltage: −Vw) are applied to the scan electrode Sc during stop periods of the positive sustain pulse Psp (FIGS. 5A and 5C), and semi-selection pulses Psw (voltage: Vsw) are applied to the scan electrode Sc at the same timing (FIGS. 5B and 5D). At the same time, a data pulse Pd (voltage: Vd2−Vd1) is applied to the data electrode Di (FIG. 5E) to cause write discharge.

In this example of driving, the respective pulses applied to the scan electrode Sc and sustain electrode Su are shifted in the positive potential direction by 1/2Vs with respect to those in the example of driving shown in FIGS. 2A to 2E. If, therefore, Vd1 corresponding to a shift in the data pulse Pd applied to the data electrode is set to almost 1/2Vs, the same voltage balance as that described above is achieved between the scan electrode Sc, sustain electrode Su, and data electrode Di of a display cell 1.

Figure 6:
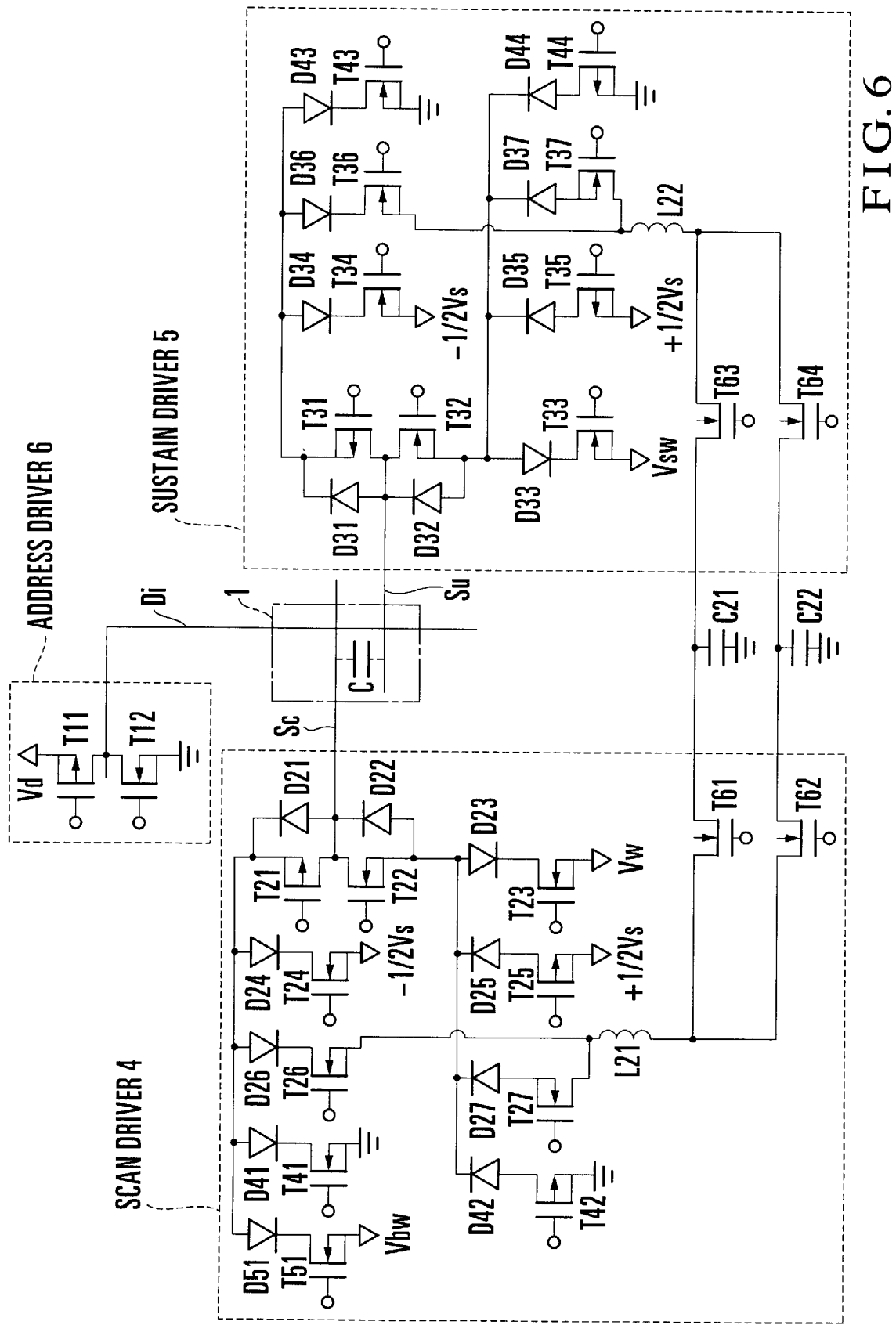
FIG. 6 is a circuit diagram showing the driving circuit of a PDP according to the third embodiment of the present invention.

FIG. 6 shows the driving circuit of a PDP according to the third embodiment of the present invention, and more specifically, the detailed arrangements of a scan driver 4, sustain driver 5, and address driver 6 which are used to drive the AC discharge memory-driven PDP shown in FIG. 14.

In this driving circuit, transistors T41, T42, T51, T61, and T62 and diodes D41, D42, and D51 are added to the scan driver 4 shown in FIG. 1 to apply the ground (GND) potential to a scan electrode Sc and sustain electrode Su and also apply a scan base pulse Pbw (voltage: Vbw) (to be described later) to the scan electrode Sc. In addition, transistors T43, T44, T63, and T64 and diodes D43 and D44 are added to the sustain driver 5 in FIG. 1.

More specifically, in the scan driver 4, one terminal of the series circuit of transistors T21 and T22 is grounded through the diode D41 and transistor T41 and connected to the voltage Vbw through the diode D51 and transistor T51. The other terminal of the series circuit of the transistors T21 and T22 is grounded through the diode D42 and transistor T42.

In the sustain driver 5, one terminal of the series circuit of transistors T31 and T32 is grounded through the diode D43 and transistor T43 and connected to one terminal of a coil L22 through a diode D36 and transistor T36. The other terminal of the series circuit of the transistors T31 and T32 is grounded through the diode D44 and transistor T44 and connected to one terminal of the coil L22 through a diode D37 and transistor T37.

The other terminal of the coil L22 is connected to the other terminal of a coil L21 through the transistors T63 and T61. The transistors T63 and T62 are connected in parallel with the transistors T63 and T61. The node between transistors T63 and T61 is grounded through a capacitor C21. The node between the transistors T64 and T62 is grounded through a capacitor C22.

The operation of the above driving circuit will be described next. Since driving operation of a data electrode Di is the same as that in the driving circuit in FIG. 1, a description thereof will be omitted. Only driving operations for the scan electrode Sc and sustain electrode Su, which are different from those in the driving circuit in FIG. 1, will be described below.

In the scan driver 4, the transistors T41 and T42 are turned on to set the scan electrode Sc of a display cell 1 to the ground (GND) potential through diodes D21 and D22 and the diodes D41 and D42. At the same time, in the sustain driver 5, the transistors T43 and T44 are turned on to set the sustain electrode Su of the display cell 1 to the ground (GND) potential through a diode D31, the diode D43, a diode D32, and the diode D44.

A transition from the ground (GND) potential of each electrode to a positive polarity (or negative polarity) sustain pulse or a transition from a positive polarity (negative polarity) sustain pulse to the ground (GND) potential is made by recovering/using energy, using a power (charge) recovery circuit based on an LC resonance circuit made up of a panel electrostatic capacitance C and coil L.

In the driving circuit shown in FIG. 6, charges are stored in the external capacitors C21 and C22, and resonance is caused between the capacitors C21 and C22, the panel electrostatic capacitance C, and the coil L, thereby outputting an amplitude voltage waveform with a voltage higher than the voltage of the charge stored in each of the capacitors C21 and C22.

A transition from the ground (GND) potential of the scan electrode Sc of the display cell 1 to a positive sustain pulse Ps+ is made as follows. Assume that charges corresponding to voltages of +1/4V and −1/4V are respectively stored in the capacitors C21 and C22.

First of all, the transistors T27 and T61 of the scan driver 4 are turned on to supply a current from the external capacitor C21 to the scan electrode Sc through the transistor T61, the coil L21, a transistor T27, a diode D27, and the diode D22. At this time, since resonance is caused by the capacitor C21, panel electrostatic capacitance C, and coil L21, the voltage of the scan electrode Sc is raised to the voltage obtained by subtracting a circuit loss from +1/2Vs, which is almost twice the voltage of the capacitor C21.

A transition from the ground (GND) potential of the sustain electrode Su to a negative sustain pulse Ps− is made as follows. The transistors T36 and T64 of the sustain driver 5 are turned on to supply a current from the panel electrostatic capacitance C to the capacitor C22 through the diodes D31 and D36, transistor T36, coil L22, and transistor T64. At this time, since resonance is caused by the panel electrostatic capacitance C, coil L22, and capacitor C22, the voltage of the sustain electrode Su is lowered to the voltage obtained by subtracting a circuit loss from −1/2Vs, which is almost twice the voltage stored in the capacitor C22.

A transistor T25 for supplying a sustain emission current is turned on to output the positive sustain pulse Ps+ (voltage: 1/2Vs) to the scan electrode Sc through a diode D25 and the diode D22. At the same time, a transistor T34 is turned on to output the negative sustain pulse Ps− (voltage: −1/2Vs) to the sustain electrode Su through a diode D34 and the diode D31.

A transition from the positive sustain pulse Ps+ at the scan electrode Sc to the ground (GND) potential is made as follows. A transistor T26 and the transistor T61 are turned on to supply a current from the panel electrostatic capacitance C to the external capacitor C21 through the diode D21, a diode D26, the transistor T26, the coil L21, and the transistor T61. At this time, a resonance circuit is formed to set the scan electrode Sc of the display cell 1 at almost the ground (GND) potential.

A transition from the negative sustain pulse Ps− at the sustain electrode Su to the ground (GND) potential is made as follows. The transistors T37 and T64 are turned on to supply a current from the external capacitor C22 to the sustain electrode Su of the display cell 1 through the transistor T64, coil L22, transistor T37, and diodes D37 and D32. As a consequence, a resonance circuit is formed to set the sustain electrode Su at almost the ground (GND) potential as in the above case. In addition, the transistors T41 and T42 are turned on to hold the potentials of the scan electrode Sc and sustain electrode Su at the ground (GND) potential.

A transition from the ground (GND) potential of the scan electrode Sc to the negative sustain pulse Ps− is made as follows. The transistors T26 and T62 are turned on to supply a current to the capacitor C22 through the diodes D21 and D26, transistor T26, coil L21, and the transistor T62. As a consequence, as in the above case, a resonance circuit is formed by the capacitor C22, panel electrostatic capacitance C, and coil L21 to make the potential of the scan electrode Sc reach almost the negative sustain pulse potential.

A transition from the ground (GND) potential at the sustain electrode Su to the positive sustain pulse Ps+ is made as follows. The transistors T37 and T63 are turned on to supply a current from the external capacitor C21 to the sustain electrode Su through the transistor T63, coil L22, transistor T37, and diodes D37 and D32. As a consequence, a resonance circuit is formed to make the potential of the sustain electrode Su reach almost the positive sustain pulse potential as in the above case.

In addition, a transistor T24 for supplying a sustain emission current is turned on to output the negative sustain pulse Ps− (voltage: −1/2Vs) to the scan electrode Sc through the diodes D24 and D21. At the same time, the transistor T35 is turned on to output the positive sustain pulse Ps+ (voltage: +1/2Vs) to the sustain electrode Su through the diodes D35 and D32.

A transition from the negative sustain pulse Ps− at the scan electrode Sc to the ground (GND) potential is made as follows. The transistors T27 and T62 are turned on to supply a current from the external capacitor C22 to the scan electrode Sc through the transistor T62, coil L21, transistor T27, and diodes D27 and D22. As a consequence, a resonance circuit is formed to set the scan electrode Sc at almost the ground (GND) potential as in the above case.

A transition from the positive sustain pulse Ps+ at the sustain electrode Su to the ground (GND) potential is made as follows. The transistors T36 and T63 are turned on to supply a current from the panel electrostatic capacitance C to the external capacitor C21 through the diodes D31 and D36, transistor T36, coil L22, and transistor T63. As a consequence, a resonance circuit is formed to set the sustain electrode Su of the display cell 1 at almost the ground (GND) potential as in the above case.

In addition, to hold the potentials of the scan electrode Sc and sustain electrode Su at the ground (GND) potential with a low impedance, the transistors T41 and T42 are turned on to set the scan electrode Sc at the ground (GND) potential through the diodes D21, D22, D41, and D42. At the same time, the transistors T43 and T44 are turned on to set the sustain electrode Su of the display cell 1 at the ground (GND) potential through the diodes D31, D43, D32, and D44.

When the transistors T22, T23, and T24 of the scan driver 4 are turned on, a scan pulse Pw (voltage: Vw) is output to the scan electrode Sc of the display cell 1 through a diode D23 and the transistor T22. At this time, since the scan pulse Pw is superimposed on the negative sustain pulse Ps−, it suffices if the breakdown voltage of each of the transistors T21 and T22 and diodes D21 and D22 is equal to more than the potential difference between Vw and −1/2Vs.

If the transistor T51 is turned on instead of the transistor T24, the scan pulse Pw superimposed on the scan base pulse Pbw (voltage: Vbw) is applied to the scan electrode Sc. In this case, it suffices if the breakdown voltage of each of the transistors T21 and T22 and diodes D21 and D22 is equal to more than the potential difference between Vw and Vbw.

When the transistors T32 and T33 of the sustain driver 5 are turned on, the semi-selection pulse Psw (voltage: Vsw) is output to the sustain electrode Su of the display cell 1 through the diode D33 and transistor T32.

As described above, according to the driving circuit shown in FIG. 6, when sustain pulses are to be applied to the scan electrode Sc and sustain electrode Su, a transition from the negative sustain pulse Ps− to the ground (GND) potential is made first, and a transition to the positive sustain pulse Ps+ is then made. After a transition from the potential of the positive sustain pulse Ps+ to the ground (GND) potential, a transition to the negative sustain pulse Ps− is made. In addition, the scan pulse Pw can be superimposed on the negative sustain pulse Ps− or scan base pulse Pbw and applied to the scan electrode Sc.

FIGS. 7A to 7K show the first example of the driving operation of the driving circuit shown in FIG. 6.

In this example of driving, the negative sustain pulse Ps− (voltage: −1/2Vs), which is almost 1/2 the sustain discharge voltage Vs, and the positive sustain pulse Ps+ (voltage: +1/2Vs), which is almost 1/2 the sustain discharge voltage Vs, are alternately applied to the scan electrode Sc. Unlike in the example of the driving operation of the driving circuit in FIG. 1, in this example, a ground (GND) potential period is set in the interval during which the polarity of a sustain pulse is reversed, as described above.

Figure 7:
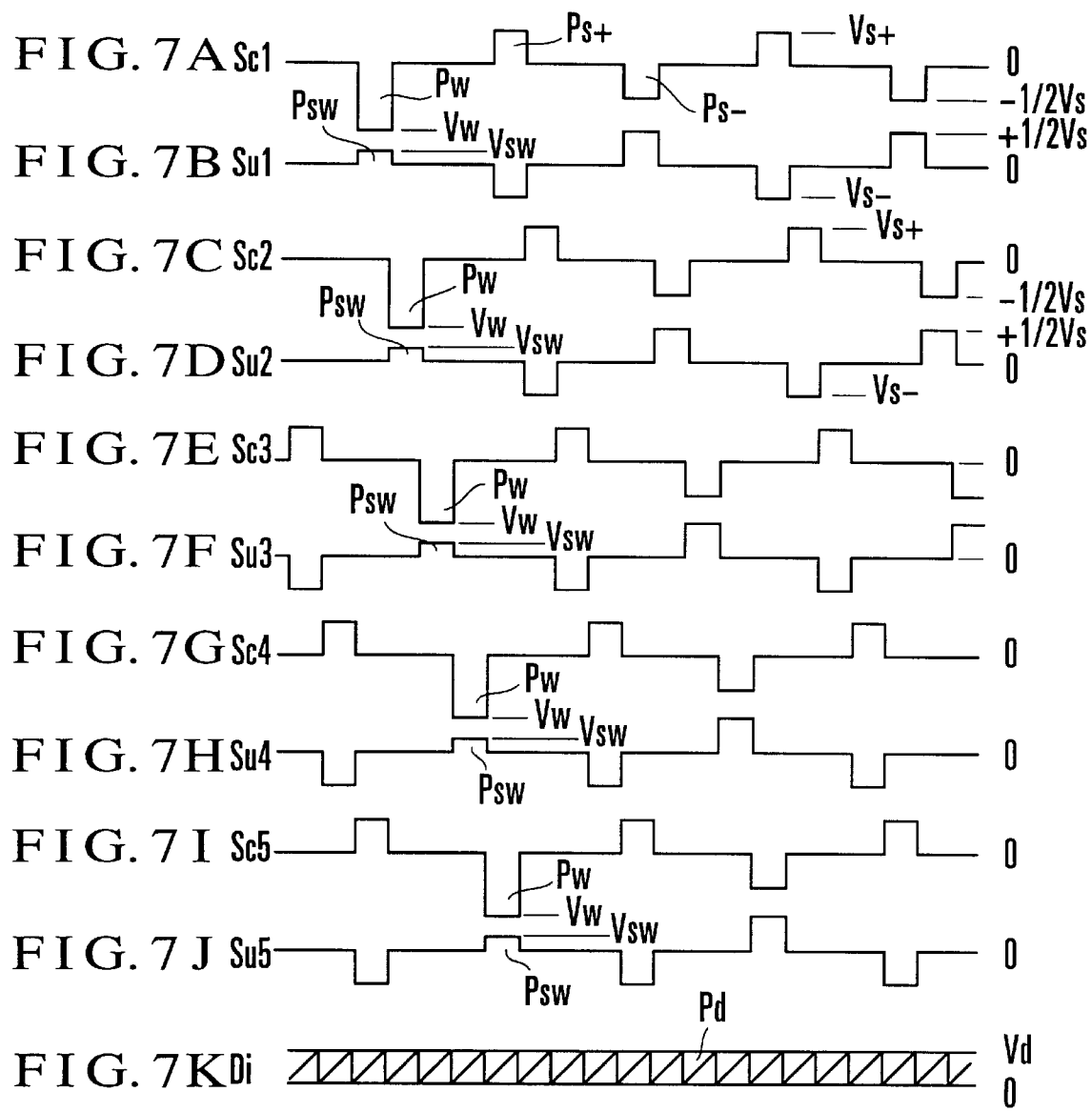
FIGS. 7A to 7K are timing charts showing the first example of the driving operation of the driving circuit in FIG. 6.
Figure 8:
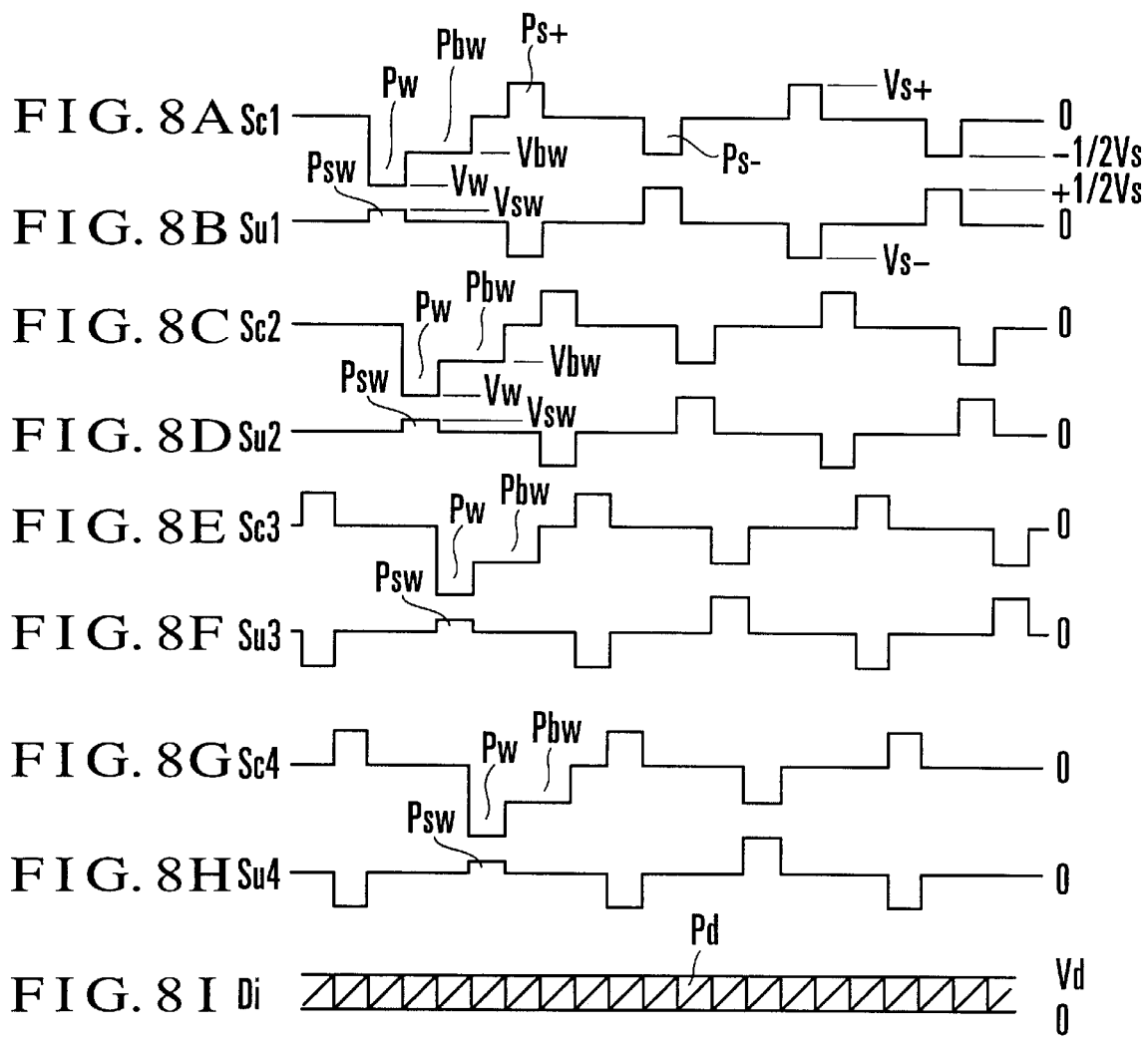
FIGS. 8A to 8I are timing charts showing the second example of the driving operation of the driving circuit in FIG. 6.

A sustain pulse Ps whose polarity is inverted at the same timing as that for a scan electrode Sc1 in FIG. 7A is applied to a sustain electrode Su1 (FIG. 7B). A sustain pulse whose phase lags behind that of the pulse applied to the scan electrode Sc by the sustain pulse width is applied to a scan electrode Sc2 (FIG. 7C). A sustain pulse whose polarity is inverted at the same timing as that for the scan electrode Sc2 is applied to the sustain electrode Su2 (FIG. 7D). A sustain pulse Ps whose phase lags behind that of the pulse applied to the scan electrode Sc2 by the sustain pulse width is applied to a scan electrode Sc3 (FIG. 7E). A sustain pulse whose polarity is inverted at the same timing as that for the scan electrode Sc3 is applied to a sustain electrode Su3 (FIG. 7F).

A sustain pulse whose phase lags behind that of the pulse applied to the scan electrode Sc3 by the sustain pulse width is applied to a scan electrode Sc4 (FIG. 7G). A sustain pulse whose polarity is inverted at the same timing as that for the scan electrode Sc4 is applied to a sustain electrode Su4 (FIG. 7H). A sustain pulse whose phase lags behind that of the pulse applied to the scan electrode Sc4 by the sustain pulse width is applied to a scan electrode Sc5 (FIG. 7J). A sustain pulse whose polarity is inverted at the same timing as that for the scan electrode Sc5 is applied to a sustain electrode Su5 (FIG. 7K).

The scan pulses Pw (voltage: Vw) are sequentially applied to scan electrodes so as to be superimposed on the negative sustain pulses Ps− applied to the scan electrodes at the same timing. The semi-selection pulses Psw (voltage: Vsw) are applied to sustain electrodes corresponding to the scan electrodes, to which the scan pulses are applied, at the same timing as the application timing of the scan pulses. In addition, the data pulses Pd (voltage: Vd) are selectively applied to the data electrodes Di at the same timing as the application timing of the scan pulses. Note that the change timing of the data pulse Pd coincides with the leading and trailing edges of the sustain pulse.

This eliminates the idle times between the data pulses and the necessity to restore the ground (GND) potential when the data pulses are continuously output. Therefore, the charge/discharge (reactive) current in the panel electrostatic capacitance C can be reduced.

In this example of driving, since only the ground (GND) potential period is present between the negative and positive sustain pulses Ps− and Ps+, the write and sustain discharge operations are the same as those in the driving circuit shown in FIG. 1.

As in the second example of the driving operation (FIGS. 3A to 3K) of the driving circuit in FIG. 1, the number of scan pulses can be increased while the sustain frequency is held at an appropriate value. Therefore, high-resolution panel and multilevel gray-scale display can be appropriately realized, and the luminous efficacy can be increased.

In general, a very large supply current is required for sustain discharge that defines the luminous brightness of a PDP. In a 40-inch class PDP, a peak current of several hundred mA is required per electrode. In addition, the supply current increases as a plurality of electrodes simultaneously cause sustain discharge. This produces a noise source to increase unnecessary emission. In this example of driving, sustain pulses are applied with time lags to reduce the supply current, thereby reducing the unnecessary emission.

In this example of driving, the phases of the sustain pulses applied to the respective electrodes are shifted from each other by 1/8 the sustain pulse period. However, the phase difference is not limited to 1/8. Likewise, the number of scan pulses to be applied within one period of a sustain pulse is not limited to eight.

In this example of driving, when write discharge is caused by the scan pulse Pw and data pulse Pd in write discharge operation, self-erasure discharge (discharge caused by an internal electric field produced by only the wall charges generated by write discharge) may be generated by the negative and positive charges respectively generated on the scan electrode Sc side and data electrode Di side upon write discharge. When self-erasure discharge occurs, the wall charges are reduced, and no transition of wall charges to sustain discharge occurs afterward.

FIGS. 8A to 8I show the second example of the driving operation of the driving circuit shown in FIG. 6, in which the occurrence of the above self-erasure discharge is suppressed.

The second example of driving differs from the first example of driving in that after the application of the scan pulse Pw to each scan electrode is complete, the ground (GND) potential is restored through the scan base pulse Pbw (voltage: Vbw) (FIGS. 8A, 8C, 8E, and 8G). Since this scan base pulse Pbw is applied halfway, the potential changes in two steps from the scan pulse potential to the ground (GND) potential. With this operation, activated particles that promote the occurrence of discharge are appropriately reduced to suppress the generation of self-erasure discharge. Since FIGS. 8B, 8D, 8F, 8H, and 8I are identical to FIGS. 7B, 7D, 7F, 7H, and 7I, a description thereof will be omitted.

Figure 9:
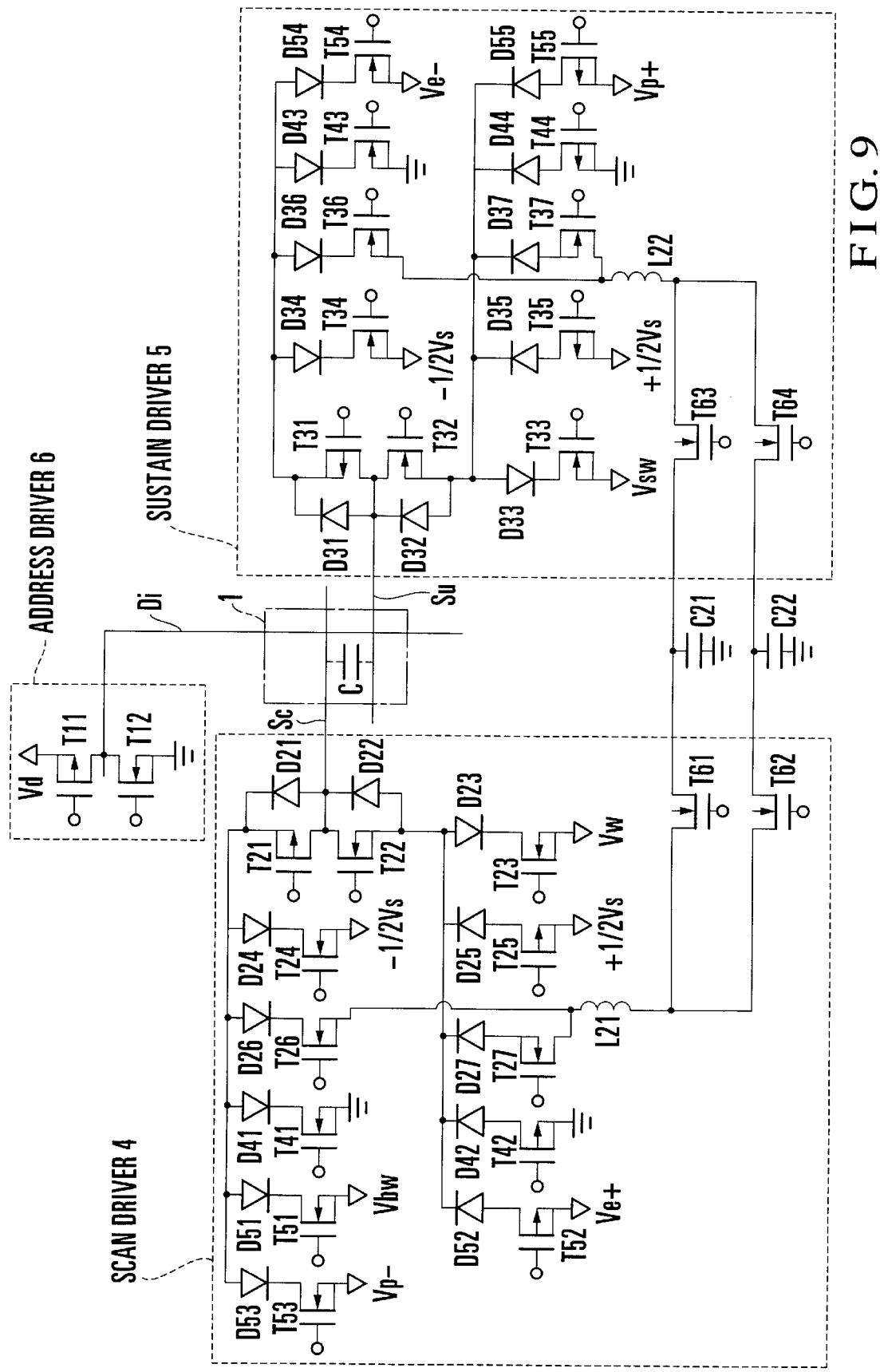
FIG. 9 is a circuit diagram showing the driving circuit of a PDP according to the fourth embodiment of the present invention.

FIG. 9 shows the driving circuit of a PDP according to the fourth embodiment of the present invention, and more specifically, the detailed arrangements of a scan driver 4, sustain driver 5, and address driver 6 which are used to drive the AC discharge memory-driven PDP shown in FIG. 14.

In this driving circuit, transistors T52 and T43 and diodes D52 and D53 are added to the scan driver 4 in FIG. 6 to generate priming pulses (pre-discharge pulses) Pp+ and Pp− (voltages: Vp+, Vp−) and sustain erase pulses Pe+ and Pe− (voltages: Ve+, Ve−). In addition, transistors T54 and T55 and diodes D54 and D55 are added to the sustain driver 5 in FIG. 6.

In the scan driver 4, one terminal of the series circuit of transistors T21 and T22 is connected to the voltage Vp− through the diode D53 and transistor T53. The other terminal of the series circuit of the transistors T21 and T22 is connected to the voltage Ve+ through the diode D52 and transistor T52.

In the sustain driver 5, one terminal of the series circuit of transistors T31 and T32 is connected to the voltage Ve− through the diode D54 and transistor T54. The other terminal of the series circuit of the transistors T31 and T32 is connected to the voltage Vp+ through the diode D55 and transistor T55.

Since this driving circuit generates data pulses Pd, sustain pulses, scan base pulses, scan pulses, and semi-selection pulses in the same manner as the driving circuit shown in FIG. 6, a description of this operation will be omitted. Only operations different from those of the driving circuit in FIG. 6 will be described.

The transistor T53 of the scan driver 4 is turned on and the remaining transistors are turned off to output the negative priming pulse Pp− (voltage: Vp−) to a scan electrode Sc of a display cell 1 through the diode D53 and a diode D21. In this state, the transistors T55 and T31 of the sustain driver 5 are turned on and the remaining transistors are turned off to output the positive priming pulse Pp+ (voltage: Vp+) to a sustain electrode Su through the diode D55 and sustain driver T31.

In addition, the transistor T52 of the scan driver 4 is turned on and the remaining transistors are turned off to output the positive sustain erase pulse Pe+ (voltage: Ve+) to the scan electrode Sc of the display cell 1 through the diodes D52 and D22. In this state, the transistor T54 of the scan driver 4 is turned on and the remaining transistors are turned off to output the negative sustain erase pulse Pe− (voltage: Ve−) to the sustain electrode Su of the display cell 1 through the diodes D54 and D31.

In this manner, the negative priming pulse Pp− (voltage: Vp−) and positive priming pulse Pp+ (voltage: Vp+) or the positive sustain erase pulse Pe+ (voltage: Ve+) and negative sustain erase pulse Pe− (voltage: Ve−) are respectively output to the scan electrode Sc and sustain electrode Su.

FIGS. 10A to 10K shows an example of the driving operation of the driving circuit shown in FIG. 9. Since the arrangement of sustain pulses to be applied to scan electrodes Sc1, Sc2, Sc3, . . . and sustain electrodes Su1, Su2, Su3, . . . of the respective display cells is identical to that shown in the timing charts of FIGS. 8A to 8I, a description thereof will be omitted.

The negative priming pulse Pp− (voltage: Vp−) is applied to the scan electrode Sc1 in a sustain pulse half-period interval between a negative sustain pulse Ps− and the instant immediately before a positive sustain pulse Ps+ (FIG. 10A). The positive priming pulse Pp+ (voltage: Vp+) is applied to the sustain electrode Su1 at the same timing (FIG. 10B).

The scan pulse Pw (voltage: Vw) is superimposed on the next negative sustain pulse Ps− applied to the scan electrode Sc1 after priming operation (FIG. 10A). A semi-selection pulse Psw (voltage: Vsw) is applied to the sustain electrode Su1 at the same timing as that of the scan pulse Pw (FIG. 10B). The data pulse Pd (voltage: Vd) is selectively applied to the data electrode Di (FIG. 10K).

The negative priming pulses Pp− are applied to the scan electrodes Sc2 to Sc4 at the same timing as that for the scan electrode Sc1 (FIGS. 10C, 10E, and 10G). The positive priming pulses Pp+ are applied to the sustain electrodes Su2 to Su4 at the same timing as that of the negative priming pulse Pp− (FIGS. 10D, 10F, and 10H).

The negative priming pulse Pp− is applied to the scan electrode Sc5 with a phase shift corresponding to half the period of the sustain pulse (FIG. 10I). The positive priming pulse Pp+ is applied to the sustain electrode Su5 at the same timing (FIG. 10J).

Although not shown, negative priming pulses and positive priming pulses are applied to the subsequent scan electrodes Sc6 to Sc8 and subsequent sustain electrodes Su6 to Su8 at the same timings as those for the scan electrode Sc5 and sustain electrode Su5. As described above, priming pulses are applied to the scan and sustain electrodes while the phases of the priming pulses are shifted from each other by the priming pulse width, i.e., the half period of the sustain pulse, for every four electrodes.

At each of the scan electrodes Sc2 to Sc4, after priming operation, the scan pulse Pw is superimposed on the next negative sustain pulse Ps−. The data pulse Pd is selectively applied to the data electrode Di at the same timing.

At each scan electrodes Sc2 to Sc4, after the scan pulse Pw is applied, the sustain pulse Ps is applied by a predetermined number of times. The positive sustain erase pulse Pe+ (voltage: Ve+) is applied to each scan electrode at the same timing as the application timing of the positive sustain pulse Ps+. In addition, the negative sustain erase pulse Pe− (voltage: Ve−) is applied to each sustain electrode at the same timing as the application timing of the negative sustain pulse Ps−.

The operation of the display cell 1 in the example of driving in FIGS. 10A to 10K will be described in detail next.

The sum of the voltages of the negative priming pulse Pp− (about −180 V) applied to the scan electrode Sc1 and positive priming pulse Pp+ (about 180 V) applied to the sustain electrode Su1 exceeds the discharge threshold voltage between the scan electrode Sc1 and the sustain electrode Su1. For this reason, priming discharge occurs, and positive and negative charges are respectively generated on the scan electrode Sc1 side and sustain electrode Su1 side. At the end of the priming pulses, priming erase operation is performed by self-erasure discharge. As a consequence, the wall charges on the scan electrode Sc1 side and sustain electrode Su1 side of the display cell 1 disappear.

At this time, activated particles generated by the priming discharge and priming erase discharge are left in the discharge space of the display cell 1. Note that if the data pulse Pd (about 70 V) for another scan electrode is applied while a priming pulse is applied, discharge also occurs between the scan electrode Sc1 and the data electrode Di. However, no problem is posed because priming discharge aims to force all the display cells on a scan line to cause discharge.

Write discharge is caused in the display cell 1 by the scan pulse Pw (about −170 V) after priming and the data pulse Pd (about 70 V) selectively applied. As a result, positive and negative charges are respectively generated on the scan electrode Sc1 side and data electrode Di side. In this case, many activated particles exist in the discharge space because only a short period of time has elapsed since the priming operation. This shortens the write discharge delay time (the time interval between the instant at which the scan pulse Pw and data pulse Pd are applied and the instant at which discharge occurs) and stabilizes write discharge.

Discharge between the scan electrode Sc1 and sustain electrode Su1 is also induced by this write discharge to generate negative charges on the sustain electrode Su1 side.

In the display cell 1 in which write discharge has occurred, the voltages based on the positive and negative charges respectively generated on the scan electrode Sc1 side and sustain electrode Su1 side in the write discharge operation are respectively superimposed on the positive sustain pulse Ps+ voltage (about 90 V) of the scan electrode Sc1 and negative sustain pulse Ps− voltage (about −90 V) of the sustain electrode Su1. The sum of these voltages exceeds the discharge threshold voltage between the scan electrode Sc1 and the sustain electrode Su1.

As a consequence, sustain discharge occurs to generate negative and positive charges on the scan electrode Sc1 side and sustain electrode Su1 side, respectively. At this time, even if the data pulse Pd for another scan electrode is applied to the data electrode Di, since negative charges have been generated on the data electrode Di side in the write discharge operation, the resultant voltage does not exceeds the discharge threshold voltage between the sustain electrode Su1, to which the negative sustain pulse Ps− is applied, and the data electrode Di. The sustain discharge characteristics are not therefore impaired.

In the next sustain pulse application period, the voltages based on the negative and position charges respectively generated on the scan electrode Sc1 side and sustain electrode Su1 side in the preceding sustain discharge are respectively superimposed on the negative sustain pulse Ps− voltage (about −90 V) at the scan electrode Sc1 and the positive sustain pulse Ps+ voltage (about 90 V) at the sustain electrode Su1, thereby causing sustain discharge. As a consequence, positive and negative charges are respectively generated on the scan electrode Sc1 side and sustain electrode Su1 side. In this case, as in the preceding sustain discharge, the sustain discharge characteristics are not impaired by the application of the data pulse Pd.

Subsequently, the positive sustain pulse Ps+ and negative sustain pulse Ps− are alternately applied to the scan electrode Sc1 and sustain electrode Su1.

In the display cell 1 which have continuously caused sustain discharge a predetermined number of times, the positive sustain erase pulse Pe+ (about 80 V) and negative sustain erase pulse Pe− (about −80 V) are respectively applied to the scan electrode Sc1 and sustain electrode Su1. The sustain erase pulse width is about 0.5 $\mu$s to 1 $\mu$s (called a narrow erase pulse). This sustain erase pulse is stopped before discharge occurs between the scan electrode Sc1 and sustain electrode Su1 and wall charges of the opposite polarity to that of the applied pulses.

Since the wall charges on the scan electrode Sc1 side and sustain electrode Su1 side are eliminated by this erase discharge, no discharge is caused by sustain pulses afterward. Even if the data pulse Pd is applied at the same timing as the application timing of the sustain erase pulse, since the amplitude of the erase pulse is equal to or less than that of the sustain pulse, no discharge occurs between the data electrode and the scan electrode or between the data electrode and the sustain electrode.

In the example of driving shown in FIGS. 10A to 10K, priming discharge is caused by respectively applying negative and positive pulses to the scan electrode Sc and sustain electrode Su. Even if, however, positive and negative pulses are respectively applied to the scan electrode Sc and sustain electrode Su, the same effect can be obtained from the viewpoint of generating activated particles before write discharge.

Sustain pulses may not be applied between priming pulses and scan pulses. In addition, the priming pulse width need not be limited to the time shown in FIGS. 10A to 10K, and should be optimized in accordance with the panel structure, sealed gas composition, and the like.

In the example of driving shown in FIGS. 10A to 10K, priming erase operation is performed by self-erasure discharge using priming pulses. In addition, priming erase operation can be performed more reliably by replacing the next positive sustain pulse Ps+ and next negative sustain pulse Ps− to be respectively applied to the scan electrode Sc and sustain electrode Su after priming with narrow erase pulses.

In each example of driving described above, a semi-selection pulse of about 10 V is applied. It is essential only that sufficient discharge be caused between the scan electrode Sc and the sustain electrode Su by a scan pulse and semi-selection pulse in write discharge operation. For example, the voltage of a semi-selection pulse may be set to 0 V. By setting the voltage of the semi-selection pulse to 0 V, this circuit can also be used as a ground potential holding circuit, and the number of circuits can be reduced. This makes it possible to attain a reduction in cost of the apparatus.

If the voltage of the data pulse Pd is high (about 90 V), the write discharge voltage generated by the scan pulse Pw and data pulse Pd becomes high. As a consequence, more positive charges and more negative charges are respectively generated as wall charges on the scan electrode Sc side and data electrode Di side. Even if, therefore, no semi-selection pulse (potential: −1/2Vs) is used, the voltage based on the positive charges in the scan electrode Sc, positive sustain pulse Ps+, and negative sustain pulse Ps− in the sustain electrode Su exceeds the discharge threshold voltage between the scan electrode Sc and the sustain electrode Su to cause sustain discharge.

The degree of freedom of the set voltage of a semi-selection pulse can be set to be high depending on the set voltages at other portions.

In each example of driving, positive and negative sustain pulses have the same amplitude. However, these pulses need not have the same amplitude as long as the sum of the voltages of the data pulse Pd and negative sustain pulse does not exceed the discharge start voltage.

Figure 11A:
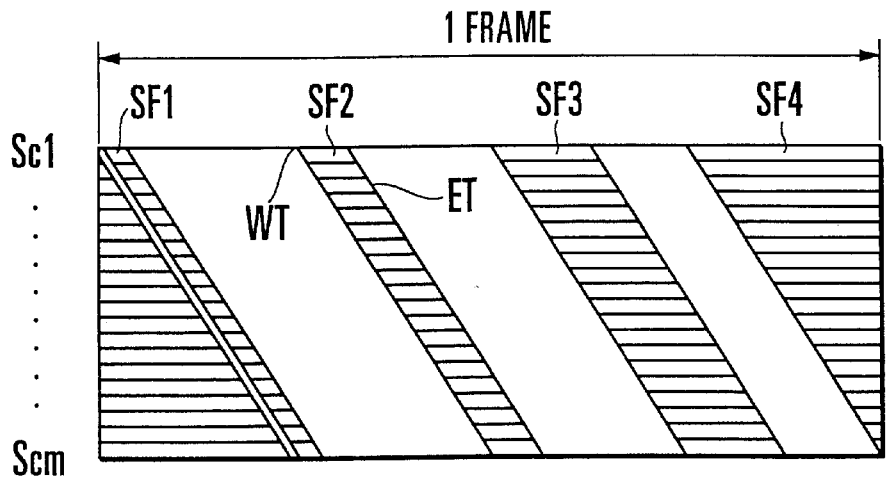
FIG. 11A is a view showing an example of a driving sequence in the PDP shown in FIG. 14.
Figure 11B:
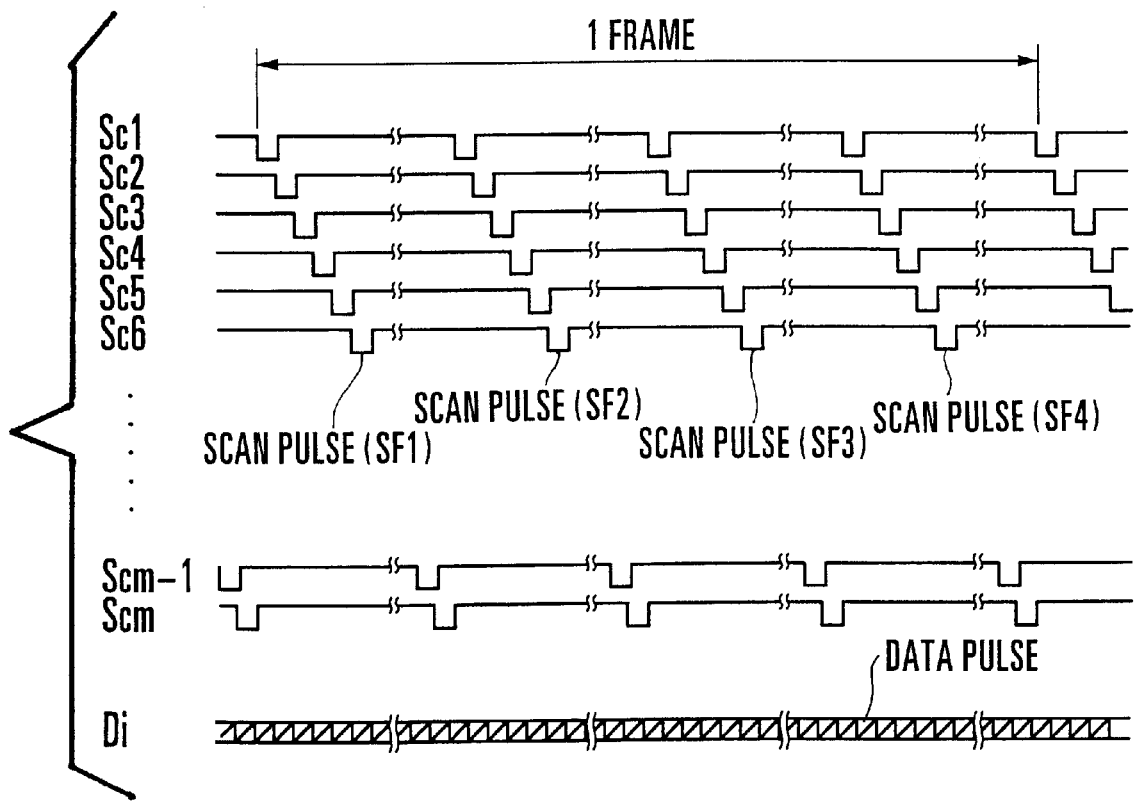
FIG. 11B is a view showing scan pulses in the sequence in FIG. 11A.

FIGS. 11A and 11B show an example of the driving sequence of the AC discharge memory-driven PDP in FIG. 14. In this driving sequence, subfields SF1 (LSB) to SF4 (MSB), i.e., four bits ($2^4$=16-level gray-scale display), are set, together with m scanning lines.

Referring to FIG. 11A, the first oblique line of each subfield SF represents a write timing WT; the horizontal lines, a sustain discharge period; and the second oblique line, a sustain erase timing ET. With this arrangement, the subfields SF in which light emission is to be performed are selected in units of display cells in accordance with a video signal, thereby realizing 16-level gray-scale display image.

FIG. 11B shows only the scan pulses extracted from the driving sequence in FIG. 11A, and more specifically, the timing of discharge between the scan pulses and the data pulses Pd. Other pulse waveforms may be obtained by applying each of the above embodiments of the present invention to each subfield. As is obvious from FIG. 11B, the entire frame can be used as a write period.

Figure 12A:
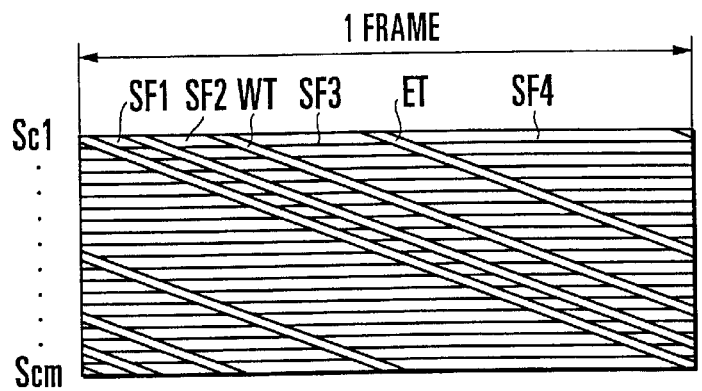
FIG. 12A is a view showing another example of the driving sequence in the PDP shown in FIG. 14.
Figure 12B:
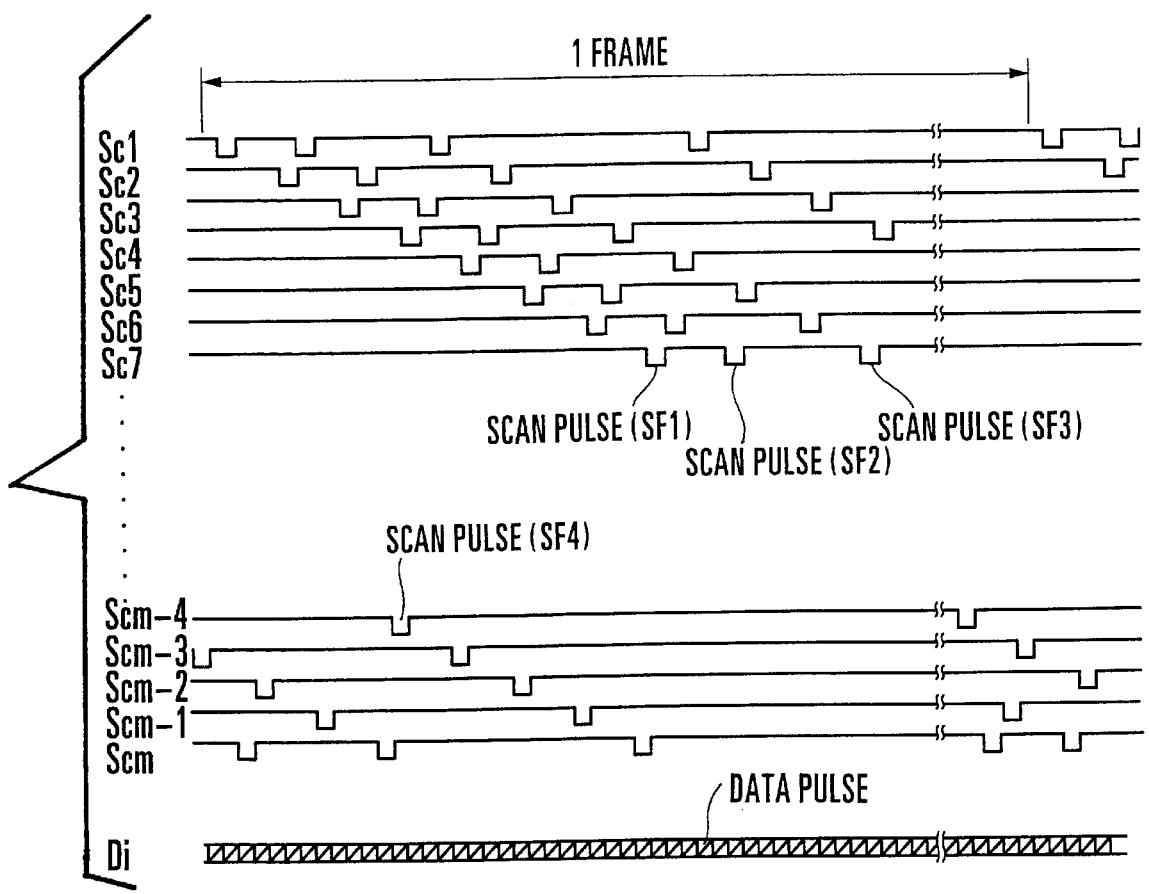
FIG. 12B is a view showing scan pulses in the sequence in FIG. 11A.
Figure 13:
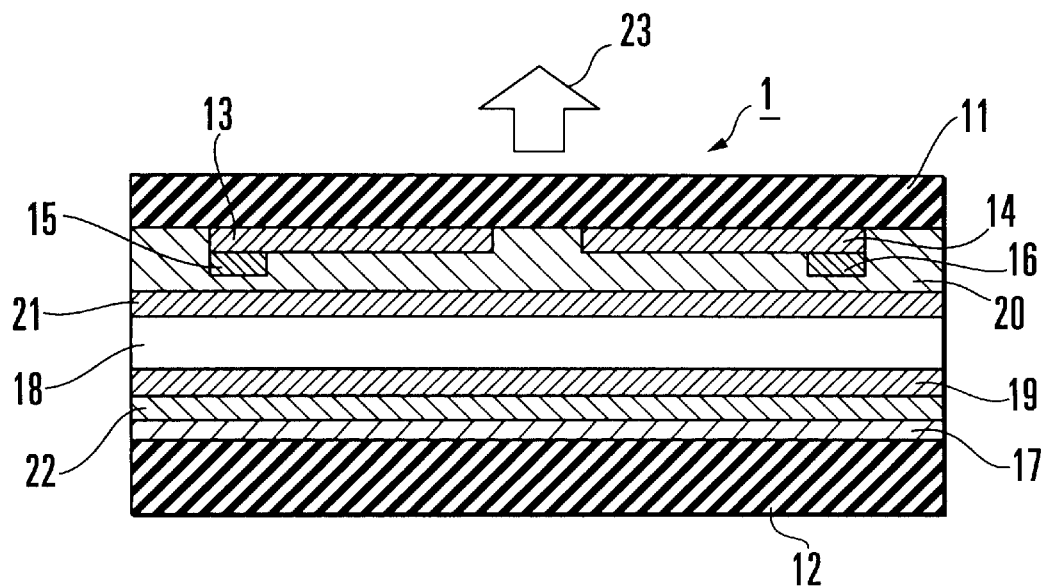
FIG. 13 is a sectional view of a display cell of a PDP.

FIGS. 12A and 12B show another example of the driving sequence of the AC discharge memory-driven PDP in FIG. 14.

FIGS. 12A shows case wherein subfields SF1 to SF4 correspond to four bits and m scanning lines are set. Referring to FIG. 12A, the first oblique line of each subfield SF represents a write timing WT; the horizontal lines, a sustain discharge period; and the second oblique line, a sustain erase timing ET. In this case, the subfields SF in which light emission is to be performed are selected in units of display cells in accordance with a video signal, thereby realizing 16-level gray-scale display image.

FIG. 12B shows only the scan pulses extracted from the driving sequence in FIG. 12A, and more specifically, the timing of discharge between the scan pulses and the data pulses Pd. Other pulse waveforms may be obtained by applying each of the above embodiments of the present invention to each subfield. As is obvious from FIG. 12B, the entire frame can be used as a write period. In addition, according to this driving method, sustain discharge periods can be used more effectively than in the driving sequence shown in FIG. 11A.

As has been described above, according to the present invention, negative potential sustain pulses as negative potentials relative to the reference potential of each data electrode and positive potential sustain pulses as positive potentials relative to the reference potential are alternately applied to scan and sustain electrodes such that the potential relationship between the scan and sustain electrodes is periodically reversed. In this state, scan pulses each having a negative potential lower than that of each negative potential sustain pulse are sequentially applied to the scan electrodes so as to be superimposed on the negative potential sustain pulses, and semi-selection pulses each having a potential lower than that of each positive potential sustain pulse are applied to the sustain electrodes at the same time the scan pulses are applied to the respective scan electrodes, each paired with a corresponding sustain electrode to constitute a display cell. In addition, data pulses each having a positive potential relative to the reference potential are selectively applied to data electrodes in accordance with the application timing of scan pulses to the respective scan electrodes on the basis of video display data. This makes it possible to ensure good write discharge and sustain discharge characteristics of the PDP. In addition, since no driving circuit with a high breakdown voltage is required for the above write discharge and sustain discharge, write discharge and sustain discharge can be caused by an inexpensive driving circuit.

Furthermore, in-phase sustain pulse trains are applied to scan electrodes on odd-numbered lines and sustain electrodes on even-numbered lines, and in-phase sustain pulse trains are applied to scan electrodes on even-numbered lines and sustain electrodes on odd-numbered lines. In addition, the phases of the sustain pulse trains applied to the scan electrodes on the odd-numbered lines and sustain electrodes on the even-numbered lines are shifted from those of the sustain pulse trains applied to the scan electrodes on the even-numbered lines and sustain electrodes on the odd-numbered lines by 180°. This makes it possible to continuously apply scan pulses to the scan electrodes so as to efficiently cause write discharge and sustain discharge.

When data pulses are to be continuously applied to data electrodes, the potentials of the data pulses are held without restoring the potentials of the data electrodes to the reference potential in the transition period of the selected scan line to which scan pulses are applied. This makes it possible to reduce the charge/discharge current based on the electrostatic capacitance of the PDP panel. Hence, the power consumption of the apparatus can be reduced.

Scan and sustain electrodes are formed into a plurality of electrode groups, and the pulse width of each of positive and negative potential sustain pulses is set to 1/(number of electrode groups) or less. In addition, the phases of positive and negative potential sustain pulses commonly applied in units of electrode groups are shifted from each other by the sustain pulse width. This makes it possible to realize a high-resolution panel and multilevel gray-scale display and improve the luminous efficacy of the PDP.

Since the potential of a scan electrode is held at the intermediate potential between the reference potential and the potential of a scan pulse in the time interval between the end of the application of the scan pulse and the start of the application of the first sustain pulse, the occurrence of self-erasure discharge can be suppressed. This facilitate a transition to sustain discharge afterward.

Prior to the application of a scan pulse, a pre-discharge pulse having a positive or negative potential is applied to a scan electrode, and a pre-discharge pulse having a negative or positive potential opposite to that of the pre-discharge pulse applied to the scan electrode is simultaneously applied to the sustain electrode, thereby causing self-erasure discharge at the end of the application of the pre-discharge pulses. As a consequence, the wall charges generated by the pre-discharge can be erased.

Prior to the application of a scan pulse, a pre-discharge pulse having a positive or negative potential is applied to a scan electrode, and a pre-discharge pulse having a negative or positive potential opposite to that of the pre-discharge pulse applied to the scan electrode is simultaneously applied to the sustain electrode, thereby causing self-erasure discharge at the end of the application of the pre-discharge pulses. In addition, a narrow erase pulse having a potential opposite to that of each pre-discharge pulse is applied to at least one of the scan and sustain electrodes at the end of the application of the pre-discharge pulses. With this operation, the wall charges generated by the pre-discharge can be reliably erased.

After the application of a scan pulse and a predetermined number of sustain pulses, narrow erase pulses having different potentials are respectively applied to scan and sustain electrodes in place of the sustain pulses. This makes it possible to avoid discharge caused by sustain pulses to be applied afterward.

What is claimed is:

1. A plasma display comprising:
   a matrix electrode section including a plurality of scan electrodes, a plurality of sustain electrodes arranged parallel to said scan electrodes, and a plurality of data electrodes crossing said scan and sustain electrodes at right angles;
   a plurality of display cells formed at the intersections of said scan electrodes, said sustain electrodes, and said data electrodes; and
   a plurality of driving means connected to said scan electrodes, said sustain electrodes, said data electrodes to drive said display cells,
   each of said driving means including
      first and second switching means for alternately applying first and second sustain pulses respectively having positive and negative potentials with respect to a reference potential of said data electrode to said scan and sustain electrodes such that a potential relationship between said scan and sustain electrodes is periodically reversed,
      third switching means for applying a scan pulse having a negative potential higher than the potential of the second sustain pulse to said scan electrode to superimpose the scan pulse on the second sustain pulse,
      fourth switching means for applying a semi-selection pulse having a potential lower than the potential of the first sustain pulse to said sustain electrode corresponding to said scan electrode when a scan pulse is applied to said scan electrode, and
      fifth switching means for selectively applying a data pulse having a positive potential with respect to the reference potential of said data electrode to said data electrode in accordance with a timing at which a scan pulse is applied to said scan electrode.

2. A display according to claim 1, wherein in-phase first and second sustain pulse trains are applied to said scan electrodes on an odd-numbered line and said sustain electrodes on an even-numbered line, and
   in-phase third and fourth sustain pulse trains whose phases are shifted from those of the first and second sustain pulse trains by 180° are applied to said scan electrodes on the even-numbered line and said sustain electrodes on the odd-numbered line.

3. A display according to claim 2, wherein said fifth switching means holds the potential of said data electrode by continuously applying data pulses to said data electrode in a transition period during which a scan pulse applied to said scan electrode is switched.

4. A plasma display comprising:
   a matrix electrode section including a plurality of scan electrodes, a plurality of sustain electrodes arranged parallel to said scan electrodes, and a plurality of data electrodes crossing said scan and sustain electrodes at right angles;
   a plurality of display cells formed at the intersections of said scan electrodes, said sustain electrodes, and said data electrodes; and
   a plurality of driving means connected to said scan electrodes, said sustain electrodes, said data electrodes to drive said display cells,
   each of said driving means including
      first and second switching means for alternatively applying first and second sustain pulses respectively having positive and negative potentials with respect to a reference potential of said data electrode to said scan and sustain electrodes such that a potential relationship between said scan and sustain electrodes is periodically reversed,
      third switching means for applying a scan pulse having negative potential higher than the potential of the second sustain pulse to said scan electrode to superimpose the scan pulse on the second sustain pulse,
      fourth switching means for applying a semi-selection pulse having a potential lower than the potential of the first sustain pulse to said sustain electrode corresponding to said scan electrode wen a scan pulse is applied to said scan electrode, and
      fifth switching means for selectively applying a data pulse having a positive potential with respect to the reference potential of said data electrode to said data electrode in accordance with a timing at which a scan pulse is applied to said scan electrode, wherein in-phase first and second sustain pulse trains are applied to said scan electrodes on an odd-numbered line and said sustain electrodes on an even-numbered line, and in-phase third and fourth sustain pulse trains whose phases are shifted from those of the first and second sustain pulse trains by 180° are applied to said scan electrodes on even-numbered line and said sustain electrodes on the odd-numbered line, and wherein said scan and sustain electrodes are formed into groups each having a predetermined number of electrodes, each of the first and second sustain pulses has a pulse width corresponding to each group, and a pulse width of a data pulse to be applied to said data electrode in each group is set to not more than 1/(number of electrodes) of a width of each sustain pulse.

5. A plasma display comprising:

a matrix electrode section including a plurality of scan electrodes, a plurality of sustain electrodes arranged parallel to said scan electrodes, and a plurality of data electrodes crossing said scan and sustain electrodes at right angles;

a plurality of display cells formed at the intersections of said scan electrodes, said sustain electrodes, and said data electrodes; and a plurality of driving means connected to said scan electrodes, said sustain electrodes, said data electrodes to drive said display cells, each of said driving means including first and second switching means for alternatively applying first and second sustain pulses respectively having positive and negative potentials with respect to a reference potential of said data electrode to said scan and sustain electrodes such that a potential relationship between said scan and sustain electrodes is periodically reversed, third switching means for applying a scan pulse having negative potential higher than the potential of the second sustain pulse to said scan electrode to superimpose the scan pulse on the second sustain pulse, fourth switching means for applying a semi-selection pulse having a potential lower than the potential of the first sustain pulse to said sustain electrode corresponding to said scan electrode wen a scan pulse is applied to said scan electrode, and fifth switching means for selectively applying a data pulse having a positive potential with respect to the reference potential of said data electrode to said data electrode in accordance with a timing at which a scan pulse is applied to said scan electrode, wherein in-phase first and second sustain pulse trains are applied to said scan electrodes on an odd-numbered line and said sustain electrodes on an even-numbered line, and in-phase third and fourth sustain pulse trains whose phases are shifted from those of the first and second sustain pulse trains by 180° are applied to said scan electrodes on even-numbered line and said sustain electrodes on the odd-numbered line, and wherein said scan and sustain electrodes are formed into groups each having a predetermined number of electrodes, a pulse width of each of the first and second sustain pulses is set to not more than 1/(number of electrodes) of a period of each sustain pulse, and the phases of the first and second sustain pulses are applied to said scan and sustain electrodes in each group are shifted from each other by not less than the sustain pulse width.

6. A display according to claim 5, further comprising sixth switching means for holding the potential of said scan electrode at an intermediate potential between the reference potential and a potential of a scan pulse in a time interval between the end of application of the scan pulse and the start of application of a sustain pulse.

7. A display according to claim 1, wherein said display further comprises:

sixth switching means for applying a first pre-discharge pulse having one of positive and negative potentials to said scan electrode before application of a scan pulse; and seventh switching means for applying a second pre-discharge pulse having a potential opposite to that of the first pre-discharge pulse to said sustain electrode when the first pre-discharge pulse is applied, and self-erasure discharge occurs at the end of application of the first and second pre-discharge pulses.

8. A display according to claim 7, further comprising eighth switching means for applying narrow erase pulses respectively having potentials opposite to those of the first and second pre-discharge pulses to at least one of said scan and sustain electrodes at the end of application of the first and second pre-discharge pulses.

9. A display according to claim 1, further comprising sixth and seventh switching means for respectively applying first and second narrow erase pulses having different potentials to said scan and sustain electrodes at the end of application of a scan pulse and a predetermined number of sustain pulses.

10. A driving method for a plasma display including a matrix electrode section including a plurality of scan electrodes, a plurality of sustain electrodes arranged parallel to said scan electrodes, and a plurality of data electrodes crossing said scan and sustain electrodes at right angles, and a plurality of display cells formed at the intersections of said scan electrodes, said sustain electrodes, and said data electrodes, comprising the steps of:

alternately applying first and second sustain pulses respectively having positive and negative potentials with respect to a reference potential of said data electrode to said scan and sustain electrodes such that a potential relationship between said scan and sustain electrodes is periodically reversed;

applying a scan pulse having a negative potential higher than the potential of the second sustain pulse to said scan electrode to superimpose the scan pulse on the second sustain pulse;

applying a semi-selection pulse having a potential lower than the potential of the first sustain pulse to said sustain electrode corresponding to said scan electrode when a scan pulse is applied to said scan electrode; and selectively applying a data pulse having a positive potential with respect to the reference potential of said data electrode to said data electrode in accordance with a timing at which a scan pulse is applied to said scan electrode.

11. A method according to claim 10, wherein the step of applying the first and second sustain pulses comprises the step of:

applying in-phase first and second sustain pulse trains to said scan electrodes on an odd-numbered line and said sustain electrodes on an even-numbered line; and applying in-phase third and fourth sustain pulse trains whose phases are shifted from those of the first and second sustain pulse trains by 180° to said scan electrodes on the even-numbered line and said sustain electrodes on the odd-numbered line.

12. A method according to claim 11, wherein the step of applying the data pulse comprises the step of holding the potential of said data electrode by continuously applying data pulses to said data electrode in a transition period during which a scan pulse applied to said scan electrode is switched.

13. A driving method for a plasma display including a matrix electrode section including a plurality of scan electrodes, a plurality of sustain electrodes arranged parallel to said scan electrodes, and a plurality of data electrodes crossing said scan and sustain electrodes at right angles, and a plurality of display cells formed at the intersections of said scan electrodes, and sustain electrodes, and said data electrodes, comprising the steps of:

alternately applying first and second sustain pulses respectively having positive and negative potentials with respect to a reference potential of said data electrode to said scan and sustain electrodes such that a potential relationship between said scan and sustain electrodes is periodically reversed;

applying a scan pulse having a negative potential higher than the potential of the second sustain pulse to said scan electrode to superimpose the scan pulse on the second sustain pulse;

applying a semi-selection pulse having a potential lower than the potential of the first sustain pulse to said sustain electrode corresponding to said scan electrode when a scan pulse is applied to said scan electrode;

selectively applying a data pulse having a positive potential with respect to the reference potential of said data electrode to said data electrode in accordance with a timing at which a scan pulse is applied to said scan electrode;

forming said scan and sustain electrodes into groups each having a predetermined number of electrodes;

setting each of the first and second sustain pulses to a pulse width corresponding to each group; and setting a pulse width of a data pulse to be applied to said data electrode in each group to not more than 1/(number of electrodes) of a width of each sustain pulse, wherein the step of applying the first and second sustain pulses comprises the step of:
applying in-phase first and second sustain pulse trains to said scan electrodes on an odd-numbered line and said sustain electrodes on an even-numbered line; and
applying in-phase third and fourth sustain pulse trains whose phases are shifted from those of the first and second sustain pulse trains by 180° to said scan electrodes on the even-numbered line and said sustain electrodes on the odd-numbered line.

14. A driving method for a plasma display including a matrix electrode section including a plurality of scan electrodes, a plurality of sustain electrodes arranged parallel to said scan electrodes, and a plurality of data electrodes crossing said scan and sustain electrodes at right angles, and a plurality of display cells formed at the intersections of said scan electrodes, and sustain electrodes, and said data electrodes, comprising the steps of:

alternately applying first and second sustain pulses respectively having positive and negative potentials with respect to a reference potential of said data electrode to said scan and sustain electrodes such that a potential relationship between said scan and sustain electrodes is periodically reversed;

applying a scan pulse having a negative potential higher than the potential of the second sustain pulse to said scan electrode to superimpose the scan pulse on the second sustain pulse;

applying a semi-selection pulse having a potential lower than the potential of the first sustain pulse to said sustain electrode corresponding to said scan electrode when a scan pulse is applied to said scan electrode;

selectively applying a data pulse having a positive potential with respect to the reference potential of said data electrode to said data electrode in accordance with a timing at which a scan pulse is applied to said scan electrode;

forming said scan and sustain electrodes into groups each having a predetermined number of electrodes;

setting a pulse width of each of the first and second sustain pulses to not more than 1/(number of electrodes) of a period of each sustain pulse; and shifting the phases of the first and second sustain pulses applied to said scan and sustain electrodes in each group from each other by not less than the sustain pulse width, wherein the step of applying the first and second sustain pulses comprises the step of:
applying in-phase first and second sustain pulse trains to said scan electrodes on an odd-numbered line and said sustain electrodes on an even-numbered line; and
applying in-phase third and fourth sustain pulse trains whose phases are shifted from those of the first and second sustain pulse trains by 180° to said scan electrodes on the even-numbered line and said sustain electrodes on the odd-numbered line.

15. A method according to claim 14, further comprising the step of holding the potential of said scan electrode at an intermediate potential between the reference potential and a potential of a scan pulse in a time interval between the end of application of the scan pulse and the start of application of a sustain pulse.

16. A method according to claim 10, further comprising the steps of:
applying a first pre-discharge pulse having one of positive and negative potentials to said scan electrode before application of a scan pulse;
applying a second pre-discharge pulse having a potential opposite to that of the first pre-discharge pulse to said sustain electrode when the first pre-discharge pulse is applied; and
causing self-erasure discharge at the end of application of the first and second pre-discharge pulses.

17. A method according to claim 16, further comprising the step of applying narrow erase pulses respectively having potentials opposite to those of the first and second pre-discharge pulses to at least one of said scan and sustain electrodes at the end of application of the first and second pre-discharge pulses.

18. A method according to claim 10, further comprising the step of respectively applying first and second narrow erase pulses having different potentials to said scan and sustain electrodes at the end of application of a scan pulse and a predetermined number of sustain pulses.

* * * * *